United States Patent
Shi et al.

(10) Patent No.: US 12,088,115 B2
(45) Date of Patent: Sep. 10, 2024

(54) HIGH EFFICIENCY RESONATOR COILS FOR LARGE GAP WIRELESS POWER TRANSFER SYSTEMS

(71) Applicant: GAN SYSTEMS INC., Ottawa (CA)

(72) Inventors: Tiefeng Shi, San Jose, CA (US); Paul Wiener, Pleasanton, CA (US)

(73) Assignee: GAN SYSTEMS INC., Ottawa (CA)

( * ) Notice: Subject to any disclaimer, the term of this patent is extended or adjusted under 35 U.S.C. 154(b) by 0 days.

(21) Appl. No.: 18/494,505

(22) Filed: Oct. 25, 2023

(65) Prior Publication Data

US 2024/0186831 A1 Jun. 6, 2024

Related U.S. Application Data

(62) Division of application No. 17/094,061, filed on Nov. 10, 2020.

(60) Provisional application No. 62/947,144, filed on Dec. 12, 2019.

(51) Int. Cl.
*H02J 50/12* (2016.01)
*H01F 38/14* (2006.01)

(52) U.S. Cl.
CPC .............. *H02J 50/12* (2016.02); *H01F 38/14* (2013.01)

(58) Field of Classification Search
None
See application file for complete search history.

(56) References Cited

U.S. PATENT DOCUMENTS

| | | |
|---|---|---|
| 8,106,539 B2 | 1/2012 | Schatz et al. |
| 8,344,552 B2 | 1/2013 | Cook et al. |
| 8,461,719 B2 | 6/2013 | Kesler et al. |
| 8,643,326 B2 | 2/2014 | Campanella et al. |
| D705,745 S | 5/2014 | Kurs et al. |

(Continued)

FOREIGN PATENT DOCUMENTS

| | | |
|---|---|---|
| WO | 2015018334 | 2/2015 |
| WO | 2017084599 | 5/2017 |

OTHER PUBLICATIONS

GaN-Systems Inc., "Power Amplifier and Coil Design Optimization for Large Air Gap Applications" AirFuel Alliance Development Forum Mar. 12-13, 2019; 18 pages.

(Continued)

*Primary Examiner* — Daniel Kessie
(74) *Attorney, Agent, or Firm* — WORKMAN NYDEGGER

(57) ABSTRACT

High efficiency resonator coils for large gap resonant wireless power transfer (WPT), and a coil design methodology are disclosed. Resonator coils comprise a coil topology defined by coil parameters in which turn dimensions, such as trace widths and spacings of each turn, are configured to reduce or minimize a variance of the z component of magnetic field, over an area of a charging plane at a specified distance, or distance range, from the coil. A Tx resonator coil comprises a capacitor arrangement of tuning and network-matching capacitors for improved coil-to-coil efficiency and end-to-end WPT system performance, e.g. for applications such as through-wall WPT, in the range of tens of watts to at least hundreds of watts. Planar resonator coil topologies are compatible with fabrication using low cost PCB technology, e.g. with multi-layer metal, to reduce losses and improve thermal performance.

3 Claims, 21 Drawing Sheets

(56) References Cited

U.S. PATENT DOCUMENTS

| | | | |
|---|---|---|---|
| D722,048 | S | 2/2015 | Kurs et al. |
| D734,731 | S | 6/2015 | Kurs |
| D769,835 | S | 10/2016 | Mccauley |
| D770,402 | S | 11/2016 | Mccauley |
| D770,403 | S | 11/2016 | Mccauley |
| 9,685,792 | B2 | 6/2017 | Yang |
| 10,224,752 | B2 | 3/2019 | Chlebosz et al. |
| 10,410,789 | B2 | 9/2019 | Kurs |
| 2012/0267960 | A1 | 10/2012 | Low |
| 2013/0241309 | A1 | 9/2013 | Arnold et al. |
| 2015/0280785 | A1 | 10/2015 | Brauchler |
| 2016/0191123 | A1 | 6/2016 | Mukherjee |
| 2016/0315670 | A1 | 10/2016 | Mukherjee |
| 2019/0036380 | A1 | 1/2019 | Garrity |
| 2019/0148971 | A1 | 5/2019 | Bae |
| 2021/0184500 | A1* | 6/2021 | Shi .......................... H02J 50/12 |

OTHER PUBLICATIONS

Lee, Seung-Hwan et al., 6.78 MHz, 50 W Wireless Power Supply Over a 60-cm Distance Using a GaN-Based Full-Bridge Inv.

Shi, Tiefeng et al., "High power Constant Current Class EF2 GaN Power Amplifier for AirFuel Magnetic Resonance Wire-less Power Transfer Systems" 2018 PCIM Europe conference, Jun. 7, 2018;4 pages.

GaN-Systems Inc., "Highly Efficient High Power PA Design for Resonant WPT" AirFuel Alliance Development Expo, Mar. 2018; 23 pages.

Lee, Seung-Hwan et al., "Development of 50W High Quality Factor Printed Circuit Board Coils for a 6.78MHz, 60cm Air-gap Wireless Power Transfer System"; J. Korean Soc. For Railway vol. 19 No. 4, pp. 468-479, Aug. 2016.

Clearman, Chris et al. "Exploring the evolution and optimization of wireless power transfer" C2000TM Real-time MCU, Texas Instruments, Jul. 2018; 9 pages.

Sah, Ajay Kumar, "Design of Wireless Power Transfer System via Magnetic Resonant Coupling at 13.56MHz", Proceeding of IOE Graduate Conference, vol. 1, Nov. 2013 pp. 202-210.

Liu, Suqi et al., " Dynamic impedance compensation for wireless power transfer using conjugate power" AIP Advances 8, 025210 (2018); https://doi.org/10.1063/1.5012272; Feb. 12, 2018; 12 pages.

Basar, Md Rubel et al., Application of Wireless Power Transmission Systems in Wireless Capsule Endoscopy: An Overview; Sensors 2014, 14, 10929-10951; doi:10.3390/s140610929.

Brech ER, Aviva, Dr. et al., "Review and Evaluation of Wireless Power Transfer (WPT) for Electric Transit Applications" P.E. FTA Report No. 0060 Federal Transit Administration, U. S. Department of Transportation Volpe National Transportation Systems Center Aug. 2014; 61 pages.

Kesler, Morris, Dr., Witricity White Paper: "Highly Resonant Wireless Power Transfer: Safe, Efficient, and over Distance" White_Paper_20161218; 13 pages.

Huang, Da et al., "Magnetic superlens-enhanced inductive coupling for wireless power transfer", J. Appl. Phys. 111, 064902 (2012); http://dx.doi.org/10.1063/1.3692757; 9 pages.

Whitley, Darrell, "A Genetic Algorithm Tutorial", Statistics and Computing vol. 4, pp. 65-85 (1994).

Schaecher, Stephan et al. "Resonant wireless power transfer", White Paper May 2018 (www.infineon.com/ wirelesscharging); 12 pages.

* cited by examiner

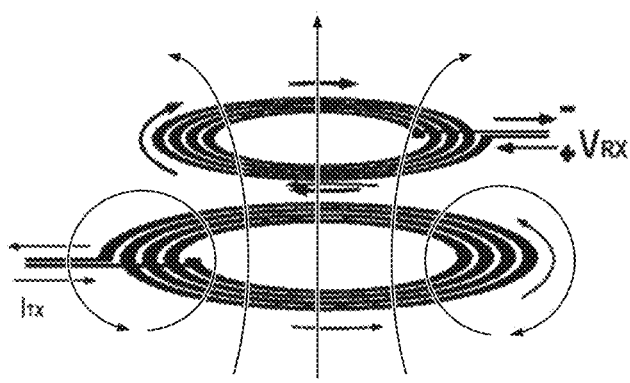
(A)
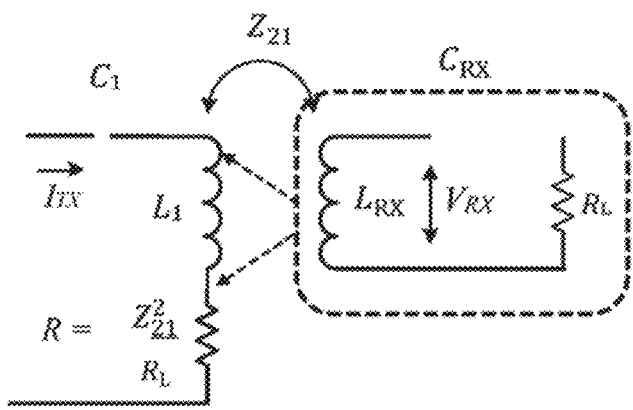
(B)
$$V_{RX} = |Z_{21} I_{TX}|$$
Series Resonance
$$j\omega L_1 + \frac{1}{j\omega C_1} = 0,$$
Power Supplied
$$P_2 = I_{TX}^2 \frac{Z_{21}^2}{R_L}$$
(C)
Fig. 5 (Prior Art)

A. Capacitor value synthesis for high efficiency

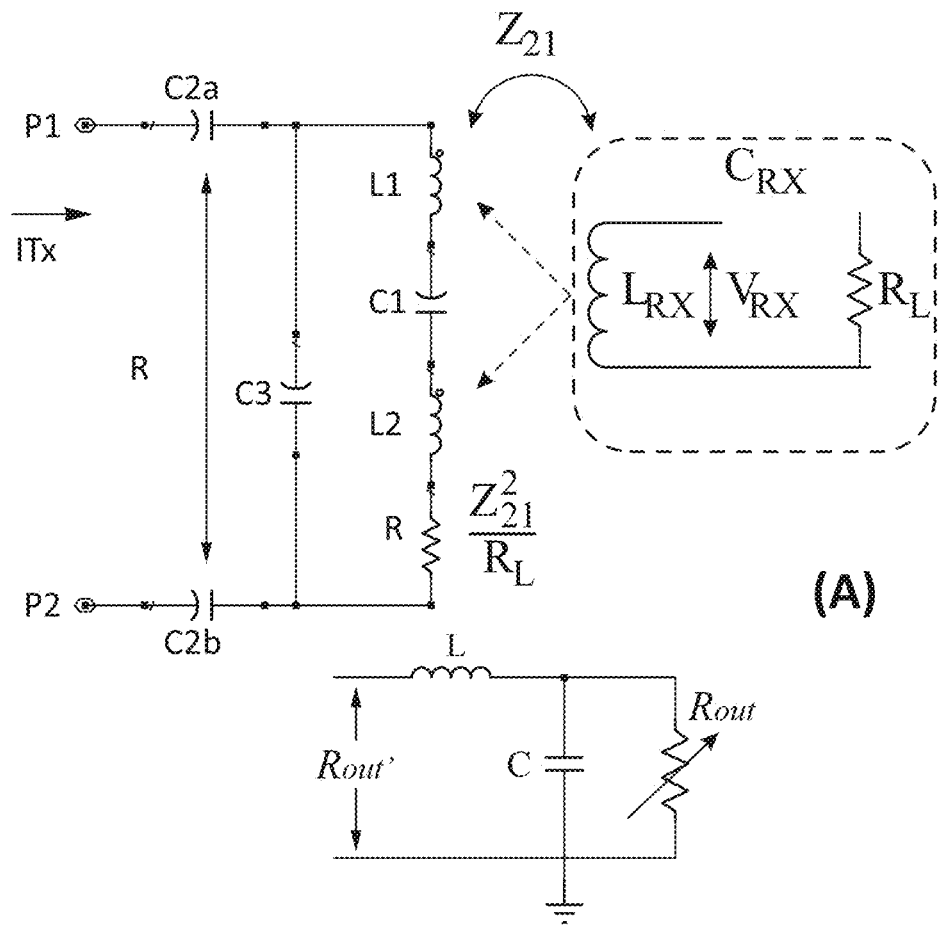
(A)
$$L = \frac{RQ_L}{w} \quad C = \frac{Q_L}{wR_L} \quad \text{and} \quad Q_L = \sqrt{\frac{R_L}{R} - 1} \quad \text{(B)}$$
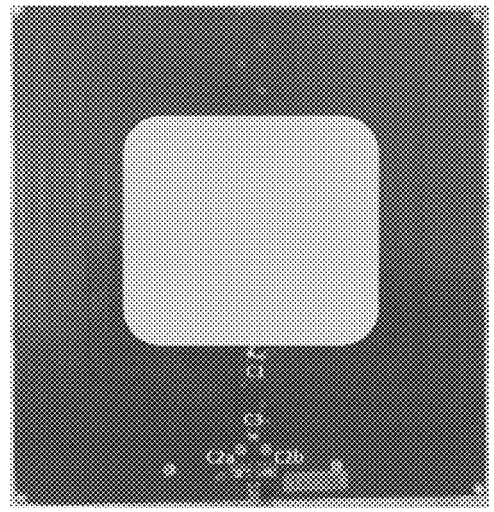
(C)
Fig. 9

B. Capacitor value synthesis for target efficiency

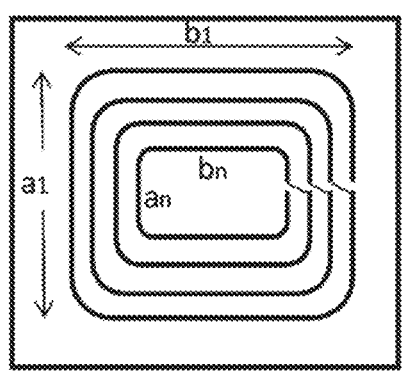 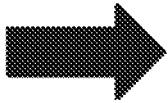 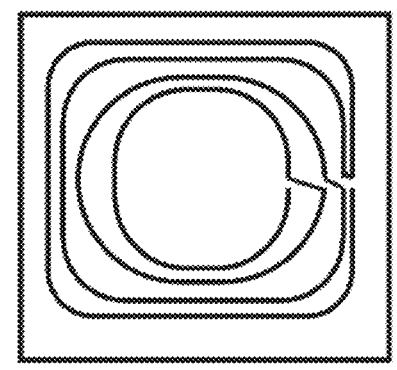
Fig. 15A                                    Fig. 15B High mutual coupling magnetic field distribution simulation in the target area for large gap design at 50mm, 100mm and 150mm height position A. Coil synthesis based on FOM B. Coil synthesis based on FOM Simulation of Tx impedance at resonating frequency point Simulation of peak Tx impedance

- Peak coil-to-coil efficiency 93% @ 30 ohm load
- System e2e peak efficiency 75%

HIGH EFFICIENCY RESONATOR COILS FOR LARGE GAP WIRELESS POWER TRANSFER SYSTEMS

CROSS-REFERENCE TO RELATED APPLICATION(S)

This application is a divisional patent application of co-pending U.S. patent application Ser. No. 17/094,061 filed Nov. 10, 2020, which patent application is incorporated herein by reference in its entirety. U.S. patent application Ser. No. 17/094,061 claims the benefit of U.S. Provisional Patent Application No. 62/947,144 entitled HIGH EFFICIENCY RESONATOR COILS FOR LARGE GAP WIRELESS POWER TRANSFER SYSTEMS and filed on Dec. 12, 2019, which is also incorporated herein by reference in its entirety.

TECHNICAL FIELD

This invention relates to wireless power transfer (WPT) and systems, methods and apparatus to accomplish WPT, and more particularly relates to resonator coil design for resonant inductive power transfer.

BACKGROUND

Electromagnetic resonance power transfer, which may be referred to as resonant inductive wireless power transfer (WPT) or resonant inductive wireless energy transfer, works by creating a wireless transfer of electrical energy between two coils, tuned to resonate at the same frequency. Based on the principles of electromagnetic coupling, resonant-based power sources inject an oscillating current into a highly resonant coil to create an oscillating electromagnetic field. A second coil with the same resonant frequency receives power from the electromagnetic field and converts it back into an electrical current that can be used to power and charge devices.

For example, Standard IEC 63028:2017(E) defines technical requirements, behaviors and interfaces used for ensuring interoperability for flexibly coupled WPT systems for the AirFuel Alliance Resonant WPT. Resonant inductive energy transfer enables transmission of energy over longer distances than non-resonant inductive charging (see Table 1 below). For example, Wireless Power Consortium (WPC), formerly Qi, relates to (non-resonant) inductive WPT, which has a limited range, e.g. a few mm. AirFuel Alliance was formerly PMA, AW4P and Rezence. AirFuel resonant inductive WPT has a larger range, e.g. a maximum range of 50 mm.

TABLE 1

| Standard Organization | Wireless Power Consortium (Qi) | AirFuel Alliance (Rezence) |
|---|---|---|
| Method | Inductive | Resonant |
| Frequency range | 80 to 300 kHz | 6.78 MHZ |
| Max. Xfr range | 5 mm | 50 mm |
| No. charging devices | One | Multiple ok |
| Communications System | Load modulation | Bluetooth |

In the context of this disclosure, "large gap WPT" refers to a gap range of e.g.: ~50 mm to ~300 mm, or more. One example application of large gap resonant WPT is through-wall power transfer for powering or charging of small equipment, e.g. communications equipment such as a 5G outdoor small cell, and devices such as a surveillance camera, outdoor lighting and sensing equipment, et al. without requiring a wired power connection. Through-wall applications would typically require WPT over a range of about 200 mm to 300 mm, i.e. a typical exterior wall thickness of a building. As an example, a through-wall WPT system may provide power, without a cord, from an indoor power source to an outdoor unit (ODU), e.g. for power transfer in the range of tens of Watts to hundreds of Watts. However, at present, there are issues with currently available WPT systems and resonator coil designs for WPT over this gap range and power range, for example, low efficiency and poor thermal performance.

There are several factors to consider for design of systems for large gap WPT, e.g. coil-to-coil efficiency between the transmitter coil (Tx coil) and the receiver coil (Rx coil), and system end-to-end efficiency at the required power, with minimization of losses, acceptable thermal performance, et al. For example, for coil-to-coil efficiency, it may be desired to produce a maximum efficiency at a specified distance or gap between Tx and Rx coils.

Currently, commercially available Tx coils for a gap range of ~200 mm have low efficiency. These coils also tend to be optimized only for a specific gap distance between the Tx and Rx coils. That is, if the Rx coil is moved away from the specified charging plane, efficiency falls off rapidly with distance. Lower efficiency means greater losses, i.e. energy losses that are dissipated as heat, which may result in overheating, i.e. exceeding a recommended operating temperature range.

For example, there is a need for improved resonator coils for WPT systems that provide at least one of improved coil-to-coil efficiency, more efficient operation over an extended range of coil-to-coil gaps, higher power operation, improved thermal performance, or improvements in other performance factors.

SUMMARY

The present invention seeks to provide resonator coils for large gap WPT systems, which mitigate or circumvent at least one of the above-mentioned issues, or at least provide an alternative.

A first aspect of the invention provides: a resonator coil for a large gap resonant inductive wireless power transfer (WPT) system comprising: a dielectric substrate; conductive traces patterned to define a coil topology comprising a plurality of n turns providing a specified inductance L, and a capacitor arrangement comprising first and second series tuning capacitors C2a and C2b in first and second feed lines of the coil, a series matching capacitor C1 at a mid-point of the coil, and a shunt capacitor C3 connected across the feed lines between the series tuning capacitors C2a and C2b and turns of the coil.

Values of capacitors C1, C2a and C2b and C3 are selected to provide a specified resonant frequency and input impedance. For example, when the resonator coil is a transmitter coil, values of capacitors C1, C2a and C2b and C3 are selected to optimize: an efficiency of a power amplifier of the WPT system; a coil-to-coil efficiency for transmitter and receiver coils of the WPT system, and an end-to-end system efficiency; or for operation of the PA at or above a minimum required efficiency, or, to maximize efficiency of the PA.

Values of capacitors C1, C2a and C2b and C3 may be selected to reduce or optimize input reflection coefficient S1 or to obtain a best efficiency point of operation of a power amplifier (PA) of the WPT system. For example, if the resonator coil has a first input impedance $Z_{TX}1$ with C2a and C2b only, and a second input impedance $Z_{TX}2$ with C1, C2a and C2b and C3, capacitor values are selected so that $Z_{TX}2 > Z_{TX}1$ to reduce or minimize an input reflection coefficient S11, or to maximize efficiency of the PA.

In some embodiments, the coil has a coil area A and each turn has turn dimensions comprising a conductive trace length, width and turn spacing; the turn dimensions are configured to provide a variance of the vertical magnetic field distribution over a target area of a charging plane spaced a distance $D_{gap}$ from the plane of the coil, said variance being less than a reference variance; wherein the reference variance is defined as a variance of the vertical magnetic field distribution over the target area of the charging plane spaced $D_{gap}$ from the plane of a reference coil of corresponding coil area A, having a reference topology comprising n turns of uniform trace width and turn spacing.

Another aspect of the invention provides resonator coil topology for a large gap resonant inductive wireless power transfer (WPT) system comprising: a coil of coil area A comprising a plurality of n turns, each turn having turn dimensions comprising a conductive trace length, width and turn spacing; the turn dimensions being configured to provide a variance of the vertical magnetic field distribution over a target area of a charging plane spaced a distance $D_{gap}$ from the plane of the coil, said variance being less than a reference variance; wherein the reference variance is defined as a variance of the vertical magnetic field distribution over the target area of the charging plane spaced $D_{gap}$ from the plane of a reference coil of corresponding coil area A, having a reference coil topology comprising n turns of uniform trace width and turn spacing; and the turn dimensions of at least one turn differ from turn dimensions of the reference coil.

Another aspect of the invention provides a resonator coil for a large gap resonant inductive wireless power transfer (WPT) system comprising: a dielectric substrate; conductive traces patterned to define a coil topology comprising a plurality of n turns over a coil area A; each turn having turn dimensions comprising a conductive trace length, width and turn spacing; the turn dimensions being configured to provide a variance of the vertical magnetic field distribution over a target area of a charging plane spaced a distance $D_{gap}$ from the plane of the coil, said variance being less than a reference variance; wherein the reference variance is defined as a variance of the vertical magnetic field distribution over the target area of the charging plane spaced $D_{gap}$ from the plane of a reference coil of a corresponding coil area A, having a reference coil topology comprising n turns of uniform trace width and turn spacing.

For example: the turn dimensions of at least one turn are configured to provide a coil topology that differs from the reference coil topology, or the turn dimensions of at least one turn are configured to provide a coil topology comprising at least one of non-uniform trace widths and non-uniform turn spacings; or the turn dimensions of each turn are individually configured to provide a coil topology comprising at least one of non-uniform trace widths and non-uniform turn spacings. The turn dimensions of each turn may be individually configured to reduce or minimize said variance. In some embodiments said variance is ≤15%, e.g. the variance is a relative standard deviation of ≤15%.

For example, the resonator coil may be configured for $D_{gap}$ in a range of 50 mm to 500 mm. For some application, e.g. for through-wall WPT, $D_{gap}$ may be in a range of ~200 mm, or e.g. 200 mm±10%, and for through-wall WPT of power in a range of tens of watts to at least hundreds of watts.

In an embodiment, a resonator coil for a large gap resonant inductive wireless power transfer (WPT) system comprises: a dielectric substrate; conductive traces patterned to define a coil topology comprising a plurality of n turns over a coil area A; each turn having turn dimensions comprising a conductive trace length, width and turn spacing; the turn dimensions being non-uniform and configured to provide a variance of the vertical magnetic field distribution over a target area of a charging plane spaced a distance $D_{gap}$ from the plane of the coil, said variance being≤15%. The resonator coil comprises a capacitor arrangement comprising first and second series tuning capacitors C2a and C2b in first and second feed lines of the coil, a series matching capacitor C1 at a mid-point of the coil, and a shunt capacitor C3 connected across the feed lines between the series tuning capacitors C2a and C2b and turns of the coil. The resonator coil topology may be optimized for reduced variance of the magnetic field relative to turns of the reference coil being substantially square or rectangular, with rounded corners.

Yet another aspect of the invention provides transmitter (Tx) for a resonant inductive wireless transfer (WPT) system comprising a power amplifier (PA) and a Tx resonator coil; wherein the Tx resonator coil comprises a dielectric substrate and conductive traces patterned to define a coil topology of a specified inductance L, and at least one of: a) a capacitor arrangement comprising first and second series tuning capacitors C2a and C2b at first and second feed ports of the coil, a series matching capacitor C1 at a mid-point of the coil, and a shunt capacitor C3 connected across feed lines between the series tuning capacitors C2a and C2b and turns of the coil; wherein: values of capacitors C1, C2a and C2b and C3 provide a specified resonant frequency and input impedance for operation of the PA at a required (or maximum) efficiency of the PA; and b) the resonator coil topology comprises a coil area A comprising a plurality of n turns, each turn having turn dimensions comprising a conductive trace length, width and turn spacing; the turn dimensions being configured to provide a variance of the vertical magnetic field distribution over a target area of a charging plane spaced a distance $D_{gap}$ from the plane of the coil, said variance being less than a reference variance; wherein the reference variance is defined as a variance of the vertical magnetic field distribution over the target area of the charging plane spaced $D_{gap}$ from the plane of a reference coil of corresponding area A, having a reference coil topology comprising n turns of uniform trace width and turn spacing.

For example, the capacitor arrangement is tuned for operation of the PA at a point of maximum efficiency, or for example, for operation of the PA at ≥90% efficiency, and said variance is ≤15%. The transmitter may be, configured for through wall WPT, e.g. over a gap distance $D_{gap}$ in a range from 50 mm to 500 mm and for transmission of power range from tens of watts to at least hundreds of watts. The PA may be implemented with GaN transistors and may be capable of operating at ≥90% efficiency.

In a resonant inductive wireless transfer (WPT) system comprising a power amplifier (PA) and a Tx resonator coil as disclosed herein, the Rx resonator coil may have the same coil topology as the Tx resonator coil.

A design methodology is disclosed comprising a method of configuring the coil topology and configuring the capacitor arrangement, e.g. for optimized efficiency.

In an embodiment, the method of configuring a resonator coil, comprises: obtaining a population of parameters ($a_1, b_1, \ldots a_n, b_n)_{initial}$ defining an initial coil topology (e.g. a reference coil topology) to be optimized, the population of parameters ($a_1, b_1, \ldots a_n, b_n)_{initial}$ comprising: a maximum coil dimension (e.g. lengths of sides of a rectangular coil, diameter of circular coil), a number of turns, a minimum spacing between turns, a minimum trace width, et al. for each turn; obtaining a target specification, comprising: selecting a gap distance $D_{gap}$ from the coil to a charging surface; selecting a charging area Areacharging of the charging surface relative to an area of the coil Areacoil; selecting a Figure of Merit (FOM) which is derived from a vertical magnetic field distribution Hz, (e.g. a variance) over the charging area Areacharging of the charging surface at gap distance $D_{gap}$ from the coil; for the initial population of parameters ($a_1, b_1, \ldots a_n, b_n)_{initial}$ computing the vertical magnetic field distribution Hz over the charging plane; computing the FOM based on a fitness function F(Hz) over said area of the charging plane; and systematically changing the population of parameters, and for each of a plurality of m populations of parameters ($a_1, b_1, \ldots a_n, b_n)_m$, where m=2 to m=M, computing Hz over the charging plane and computing the fitness function F(Hz)m over the charging plane; when the value of the fitness function F(Hz) for an mth population of parameters ($a_1, b_1, \ldots a_n, b_n)_m$, meets a target specification; storing the mth population of parameters ($a_1, b_1, \ldots a_n, b_n)_m$, as a target population of parameters; outputting the set of parameters ($a_1, b_1, \ldots a_n, b_n)_m$, corresponding to the target value of the fitness function F(Hz), to define a coil topology meeting the target specification having a coil distribution comprising said dimensions, trace widths and spacings of each of the n turns.

For example, the FOM is a variance of the vertical magnetic field distribution Hz over a target area of a charging plane spaced a distance $D_{gap}$ from the plane of the coil and the target specification comprises minimum value of said variance.

In an embodiment, the method of configuring the capacitor arrangement comprises: selecting a value of C1 to make C1 and the inductance L of the Tx coil resonate at the required frequency; setting C2a and C2b to be equal and have a value C2a=C2b=2*C1; using an Rx coil, tuning the value of C3 a target specification such as a best efficiency point of the power amplifier (PA) of the transmitter; measuring an S11 parameter (i.e. input reflection coefficient); tuning C3 and C2a, C2b so that the Tx coil resonates at the required frequency and so that the Tx impedance ZTx is in range for operation of the PA at an efficiency in a range from a minimum required efficiency to a maximum efficiency.

Thus, resonator coils for large gap WPT systems, a resonator coil design methodology, and a high efficiency transmitter for large gap WPT, such as through-wall WPT are disclosed.

BRIEF DESCRIPTION OF THE DRAWINGS

FIG. 5 (Prior Art) shows (A) a schematic diagram representing a WPT system comprising Tx and Rx resonator coils; (B) a simplified equivalent system model; and (C) calculation of Rx power in Tx the equivalent loop;

FIG. 9 shows (A) a schematic with a resonator coil structure for large gap WPT system of an first example embodiment; (B) a simplified equivalent circuit for impedance matching; and (C) a photograph of a resonator coil of the first embodiment, implemented using PCB technology, to show coil topology and positions of the tuning and network matching capacitors C1, C2a and C2b and C3;

FIGS. 15A and 15B show schematic diagrams to illustrate coil topology synthesis of an embodiment, based on an arbitrary initial coil topology (reference coil topology) with optimization of the coil topology to meet a target specification, e.g. to optimize uniformity of the z-component $H_z$ of the magnetic field over a charging plane at a distance $D_{gap}$ from the plane of the Tx resonator coil;

The foregoing and other features, aspects and advantages of the present invention will become more apparent from the following detailed description, taken in conjunction with the accompanying drawings, of embodiments of the invention, which description is by way of example only.

DETAILED DESCRIPTION

Figure 1:
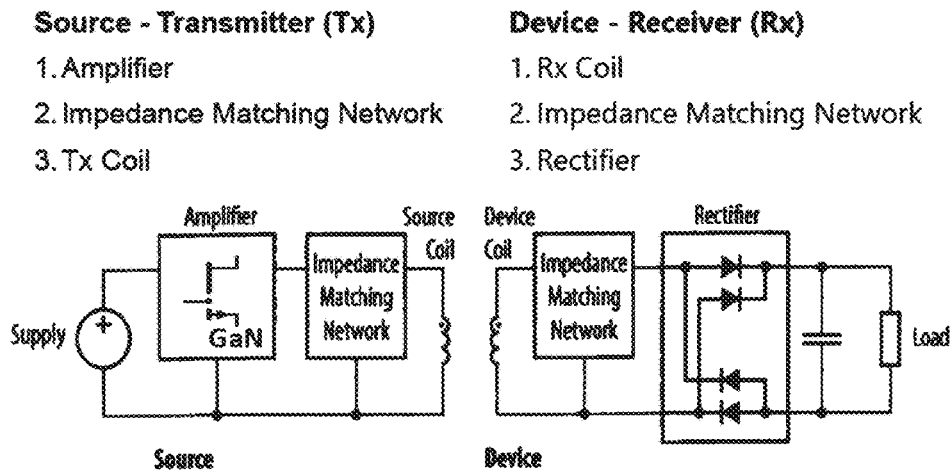
FIG. 1 shows a simplified schematic diagram of an example resonant inductive WPT system.
Figure 2:
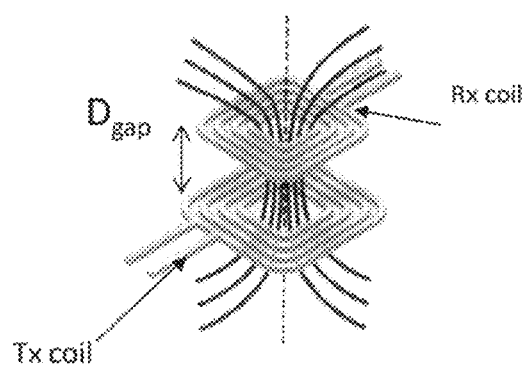
FIG. 2 shows a schematic diagram of resonant inductive coupling of Tx and Rx coils.
Figure 3:
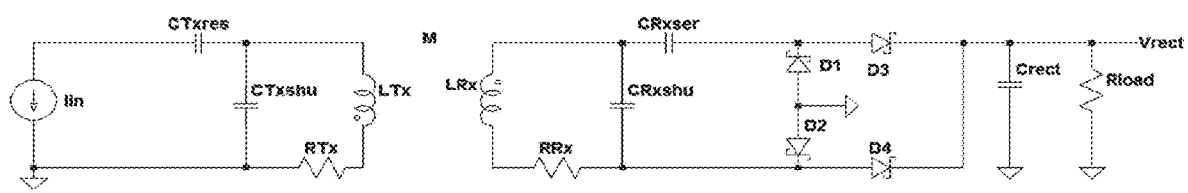
FIG. 3 shows an equivalent circuit for a WPT system of an embodiment.

An example of a resonant inductive wireless power transfer (WPT) system is shown schematically in FIG. 1. In this WPT system, the source or transmitter (Tx) comprises an RF source in the form of a power amplifier (PA), an impedance matching network, and a Tx resonator coil. The PA drives the system and is modeled as an ideal constant current source. The receiver comprises a Rx resonator coil, and impedance matching network, and a rectifier, e.g. a diode bridge. The device being charged or powered is represented by the load. The diode bridge is used to rectify the input RF signal into a DC signal, e.g. for powering the device or charging a battery. The magnetic field providing resonant inductive coupling of the Tx and Rx coils is represented schematically in FIG. 2. An equivalent circuit for an example resonant WPT system of embodiments of the present invention is shown in FIG. 3.

The Tx and Rx coils are an important subsystem. For example, based on AirFuel Resonant specifications, these coils (also called resonators) are required to exhibit certain performance characteristics. However, current AirFuel Resonant specifications are limited to WPT for a maximum gap of 50 mm and a maximum power of 70 W. Thus, resonator coils designed to meet current AirFuel performance characteristics are not optimized for larger gap WPT e.g. for through-wall WPT. For large gaps, e.g. of 100 mm, 200 mm or more, there is low mutual coupling between the Tx and Rx coils and improved coil designs are required for improved coil-to-coil efficiency to enable wireless transfer of higher power, e.g. hundreds of watts, over large gaps.

Flat planar resonator coils may be fabricated using conventional PCB technology, e.g. the turns of the coil are formed by conductive copper traces on or in a dielectric substrate. For a planar coil, the dominant magnetic field component is along the z direction, i.e. $H_z$, perpendicular to the plane of the coil. Field uniformity of the $H_z$ over the charging area is important for balancing the dissipation power, i.e. to maintain a lower operating temperature. This $H_z$ field component is dependent on the design, or topology, of the coil, i.e., number and distribution of the coil turns, and the specified distance or gap $D_{gap}$ between the Tx coil and the Rx coil. Planar resonator coil designs having a conventional topology, e.g. with numerous rectangular or square turns, and uniform trace widths and spacings between turns, produce a highly non-uniform magnetic field distribution, because destructive and constructive fields generated by each turn will add up in a non-optimized form, resulting in high Q and large field variations. For WPT over large gaps, such as through-wall transfer, there is weak coupling between the Tx and Rx coils resulting in low efficiency for systems using known coil designs.

There is a need for improved or optimized resonator coil topologies to provide a more uniform magnetic field distribution for higher power, large gap WPT, and solutions that provide for improved efficiency of large gap WPT systems where there is weak coupling between the Tx and Rx resonator coils.

A coil design methodology is presented for configuring a Tx resonator coil topology to improve uniformity of the magnetic field distribution and to improve efficiency to meet a target performance specification. To improve efficiency, Tx resonator coils of example embodiments comprise a capacitor arrangement comprising tuning capacitors and network matching capacitors. Values of tuning capacitors and network matching capacitors are selected to provide improved efficiency, e.g. for increased coil-to-coil and system end-to-end efficiency. Capacitor value synthesis for improved efficiency can be applied to resonator coils of an arbitrary coil topology. To mitigate the detrimental effects caused by large magnetic field variations, the design methodology provides for a coil topology in which dimensions of each turn of the coil are individually configured to minimize, or at least reduce, magnetic field variations over the desired plane, e.g. an area of a charging plane at a specified distance from the plane of the Tx coil. Resonator coils of example embodiments are disclosed in which the coil topology is configured to provide a magnetic field distribution to meet a target specification, e.g. to minimize a variance of the magnetic field over an area of the charging plane, and wherein an arrangement of tuning and matching capacitor values is selected for increased efficiency.

Capacitor Value Synthesis for Improved Efficiency

Figure 4:
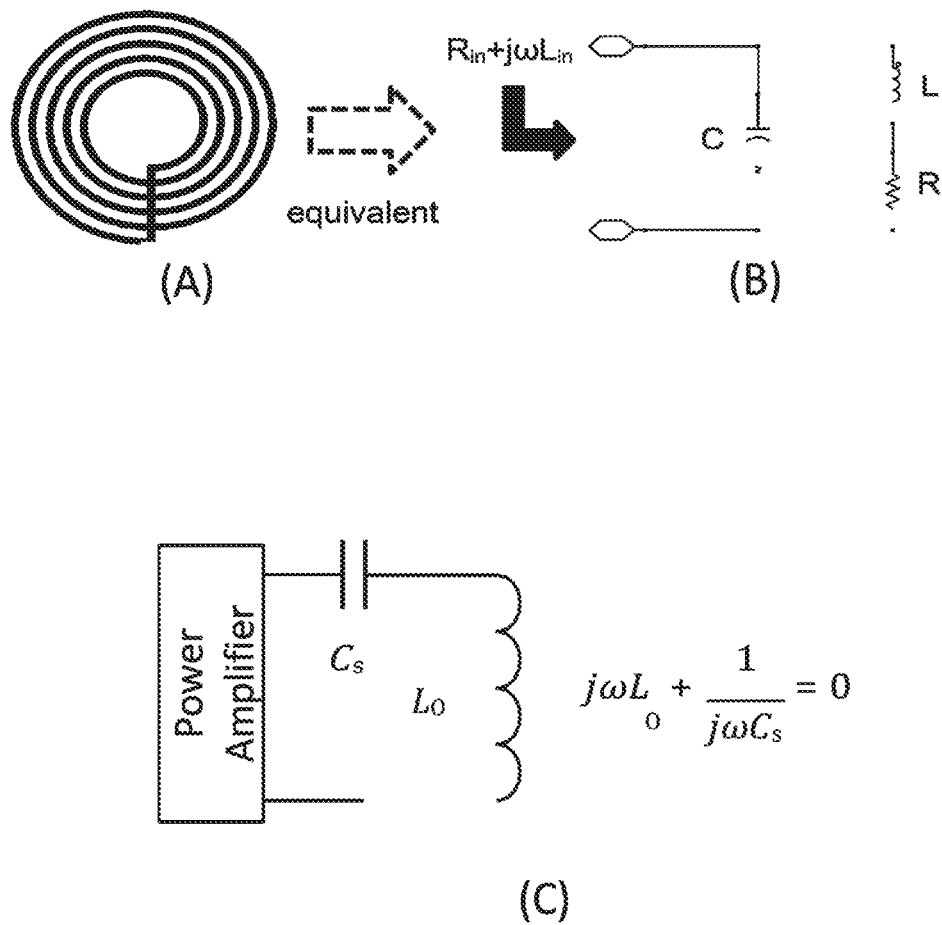
FIG. 4 (Prior Art) shows (A) an example of a multi-turn coil for wireless charging; (B) a simplified equivalent circuit model of the wireless charging coil; and (C) a power amplifier and resonant operation with a multi-turn coil $L_O$ and a capacitor $C_S$.

Consider an example in which Tx and Rx resonator coils are designed to operate at a resonating frequency point, e.g. 6.78 Mhz or 13.56 MHz. The equivalent input impedance would be the coil DC resistance. FIG. 4 shows (A) a multi-turn wireless coil example; (B) a simplified equivalent circuit; and (C) resonant operation with a power amplifier, a multiple-turn coil $L_0$ and tuning capacitor Cs. FIG. 5 shows (A) a schematic of mutual coupling between Tx and Rx coils of a WPT system; and B) a simplified circuit model of a wireless charging coil and the power amplifier load impedance at the output of the PA in a WPT system. The series capacitance C1 is a resonance capacitance for the multi-turn coil; L1 represents the total inductance of the multi-turn coil, and R the effective series resistance, which is a combination of radiation and ohmic resistances of the coil ($Z^2_{21}/R_L$). When the coil operates at a resonating frequency, the equivalent reactance and power of the resonant LC circuit shown in FIG. 5 (B) can be described by the following equations in FIG. 5 (C).

The mutual coupling $Z_{21}$ between the Tx and Rx coils for large gap WPT system is quite low, typically less than 0.1. The equivalent impedance $R_{TX}$ in the output of the PA is quite low. For example, for a 4 turn 270 mm coil, the DC resistance is about 1 ohm, and the inductance is about 10 µH. For a Rx load with weak mutual coupling, the equivalent impedance in the output of Tx PA could be tuned around 10 ohm at the resonant frequency point. The peak efficiency was around 80%. The PA cannot operate at maximum efficiency for this range of input impedance.

Figure 6:
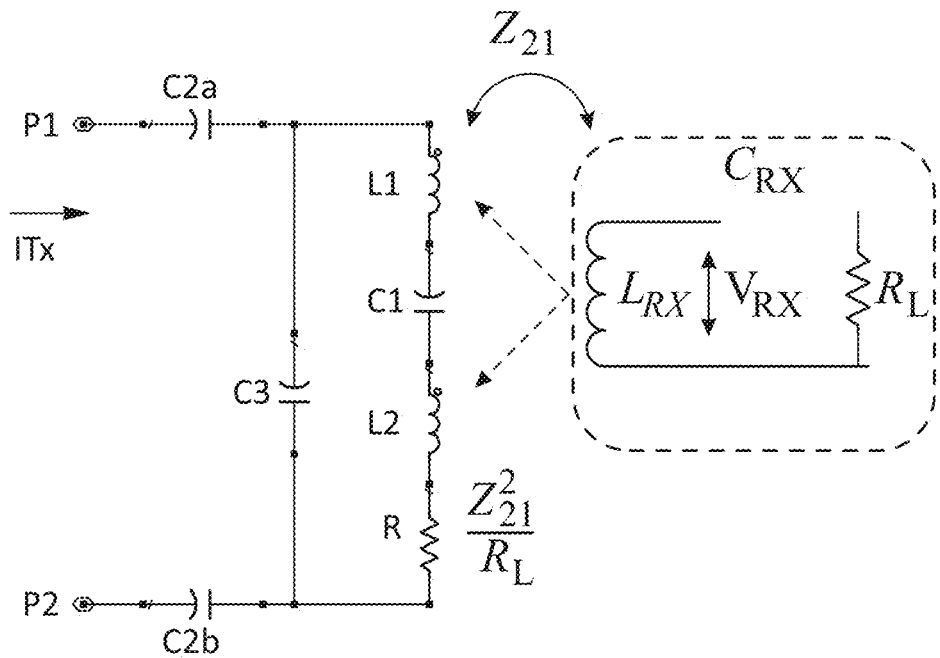
FIG. 6 shows a circuit schematic of a WPT system of an embodiment comprising a Tx resonator coil with an arrangement of tuning capacitors and network matching capacitors for improved efficiency.
Figure 7:
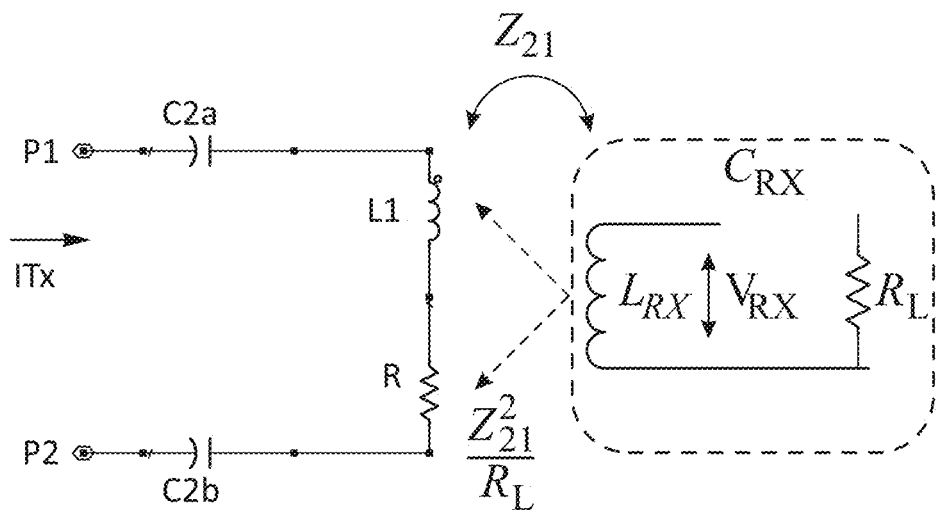
FIG. 7 shows a circuit schematic of a WPT system comprising a Tx resonator coil with a conventional arrangement of series tuning capacitors.

A WPT system of an embodiment configured for optimizing efficiency for both the Tx and Rx coils is shown schematically in FIG. 6. The Tx resonator coil has an inductance L of L1+L2, and includes first and second series tuning capacitors C2a and C2b positioned at the input ports of the coil, and a series matching capacitor C1 positioned in the center of the coil, i.e. between L1 and L2, and a shunt capacitor C3 which is a network matching capacitor. For comparison, a conventional arrangement or a resonator coil with series tuning capacitors C2a and C2b is shown in FIG. 7. Appropriate selection of the values of the tuning capacitors, C2a and C2b, and network matching capacitors C1 and C3 provides for increased coil-to-coil efficiency and system end-to-end efficiency. That is the resonator coils include matching capacitors C1 and C3 to tune the input impedance of the Tx coil into a range that improves or optimizes the efficiency of the PA.

Figure 8:
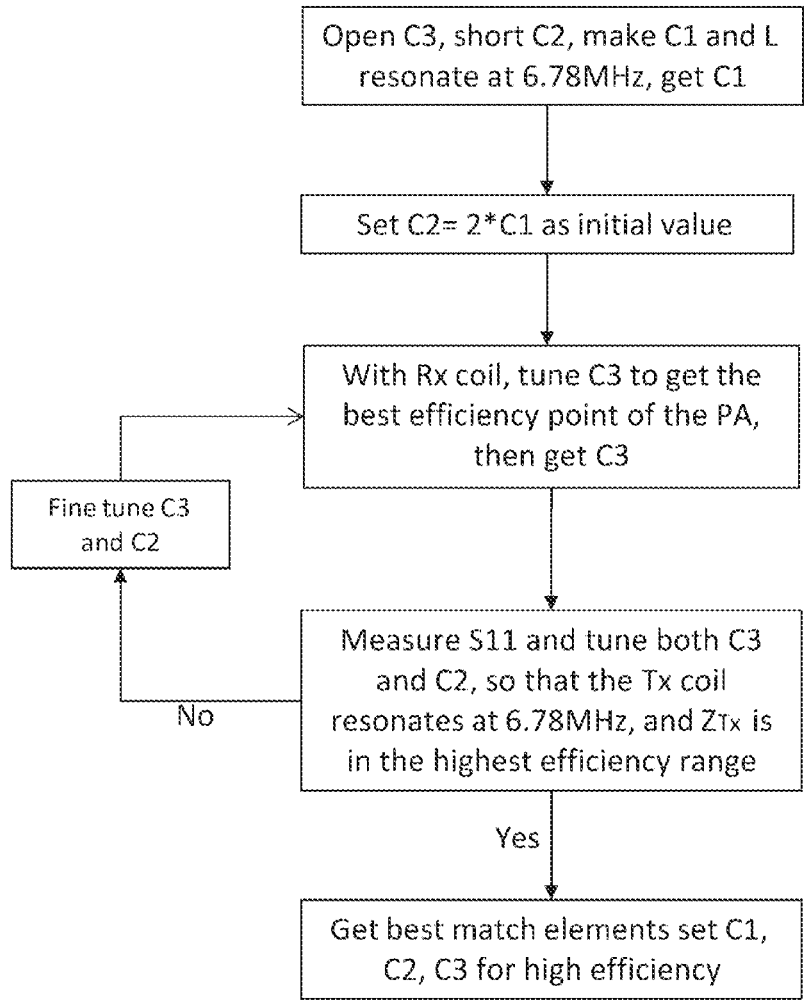
FIG. 8 shows a simplified flow chart to illustrate a method of determining capacitor values (capacitor value synthesis) for the resonator coils of the embodiment shown in FIG. 6.

FIG. 8 shows a simplified flowchart for a method of optimizing capacitor values for an example embodiment, e.g. as shown in FIG. 6, for a resonant frequency of e.g. 6.78 MHz. Initially, a value of C1 is selected to make C1 and the inductance L of the Tx coil resonate at the required frequency (step 8-1). That is, L=L1+L2 as shown in FIG. 6 (C). C2a and C2b are initially set to be equal and have a value C2a=C2b=2*C1 (step 8-2). Using the Rx coil, the value of C3 is then tuned to obtain the best efficiency point of the power amplifier (PA) of the transmitter (step 8-3). The S11 parameter, i.e. input reflection coefficient is measured. S11 is dependent on the input impedance $Z_{Tx}$ of the Tx Coil. Then, C3 and C2a, C2b are tuned so that the Tx coil resonates at the required frequency of 6.78 MHz, and so that the Tx impedance $Z_{Tx}$ is in a maximum efficiency range of the PA, and to minimize S11 (8-4). If needed the latter two steps are repeated with fine tuning of C3 and C2a, C2b, until the best matching elements are obtained for highest efficiency (8-5).

FIG. 9(C) shows a photograph of resonator coil of a first example embodiment. In this embodiment, the coil is fabricated using PCT technology, and comprises 4 turns, i.e. 4 rectangular turns, with rounded corners, provided by copper traces embedded in the black area of the PCB shown in FIG. 9(C). The design equivalent circuit for the resonator coil of FIG. 9(C) shown in FIG. 9(A), which is the same as that shown in FIG. 6. Impedance match equations are shown in FIG. 9(B). The dimensions of each turn of the coil are individually optimized to minimize a variance of the z component $H_z$ of the magnetic field over a required area of a charging plane, e.g. 200 mm from the plane of the coil. Actual positions of the matching capacitors C1 and C3 and positions of tuning capacitors C2a and C2b are shown in FIG. 9(C). The tuning capacitors C2a and C2b are series capacitors at each of the feed ports (input ports) to the coil. Matching capacitor C1 is a series capacitor placed at the center (mid-point) of the coil. The other matching capacitor C3 is a shunt capacitor connected across the feed lines between the series tuning capacitors C2a and C2b and the turns of the coil.

Figure 10:
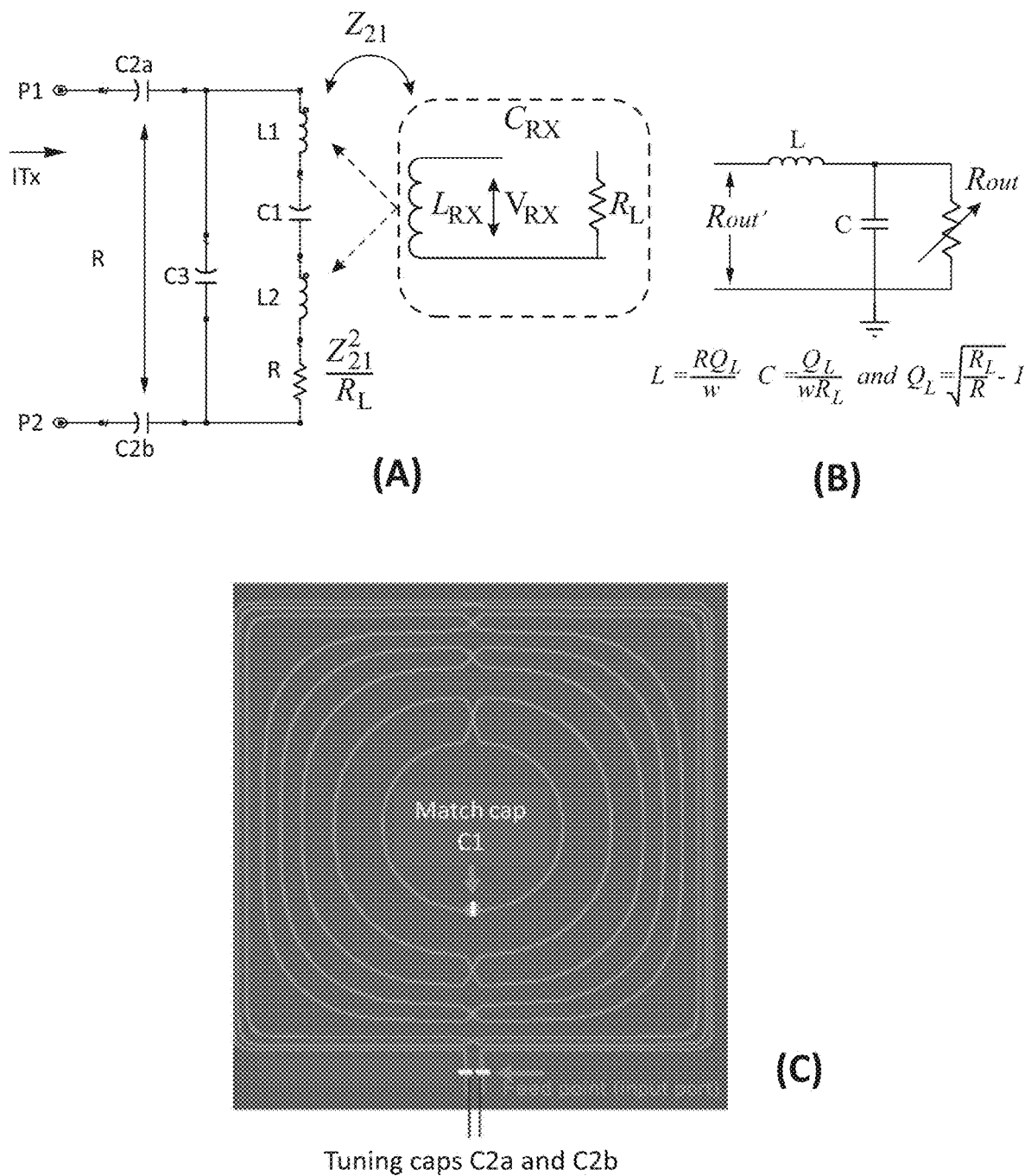
FIG. 10 shows (A) a circuit schematic with a resonator coil structure for large gap WPT system of a second example embodiment; (B) a simplified equivalent circuit for impedance matching; and (C) a photograph of a resonator coil of the second embodiment to show coil topology and positions of the matching capacitor C1 and tuning capacitors C2a and C2b.

A coil design of a second example embodiment is shown in FIG. 10(C). The design equivalent circuit shown in FIG. 10(A). Impedance match equations are shown in FIG. 10(B). As shown in FIG. 10(C), the coil topology comprises 8 non-uniform turns. The dimensions of each turn of the coil are optimized to minimize a variance of the z component $H_z$ of the magnetic field over a required area of a charging plane, e.g. 200 mm from the plane of the coil. The positions of the matching capacitor C1 and tuning capacitors C2a and C2b are shown in FIG. 10(C). In this example, C3 is omitted. For example, synthesis of capacitor values to determine required values of C1, C2a and C2b, and C3, as explained with reference the flow chart in FIG. 8, may determine that C3 has a very small value. In that case, C3 can be omitted, because addition of C3 would have an insignificant effect on efficiency.

Figure 11:
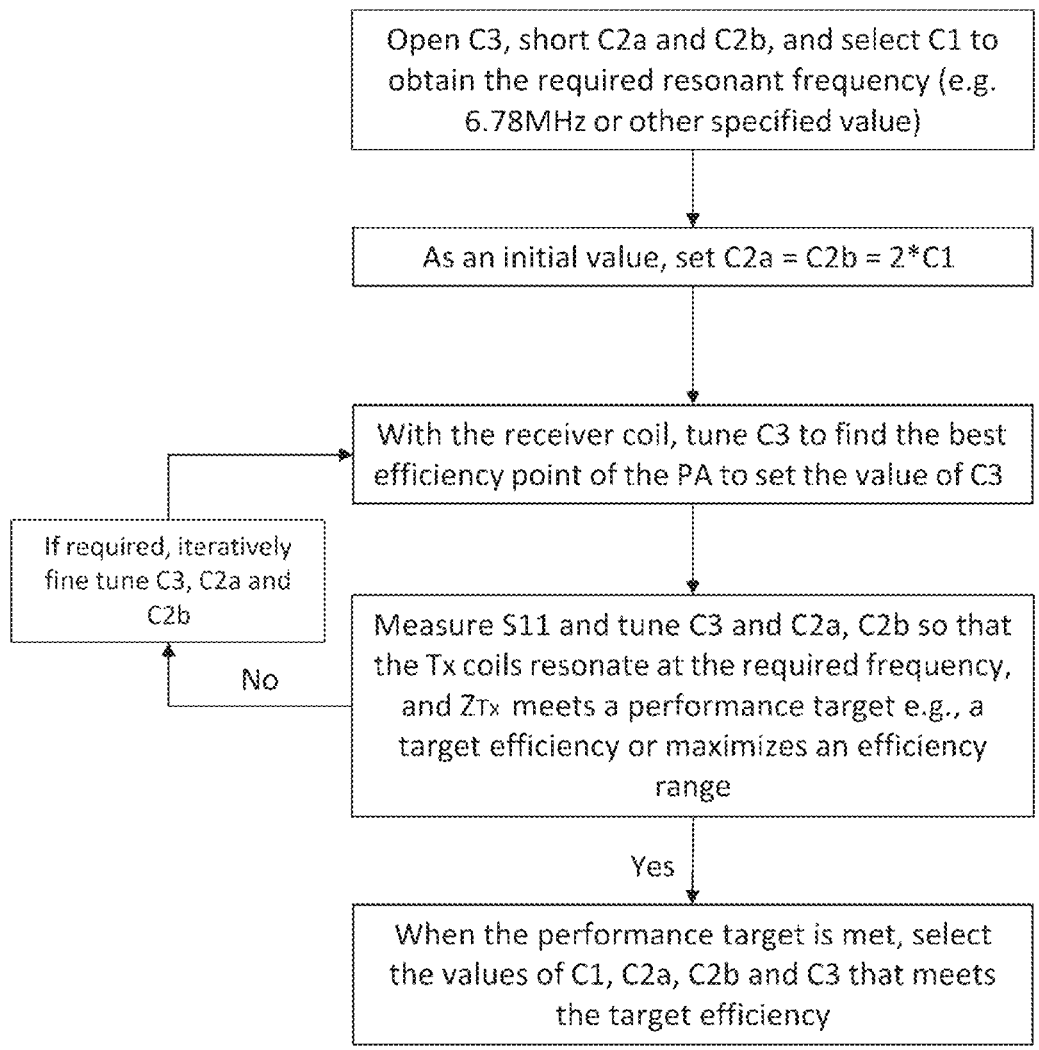
FIG. 11 shows a flow chart for determining matching and tuning capacitor values (capacitor value synthesis) to meet a target performance specification.

More generally, the method of capacitor value synthesis comprises selecting capacitor values C1, C2a, C2b, and C3 to meet a required performance target, e.g. a target efficiency, such as optimizing the coil-to-coil efficiency and the WPT system end-to-end efficiency, as illustrated schematically in the flow chart shown in FIG. 11.

Coil Topology Synthesis for Improved Uniformity of Magnetic Field Distribution

Figure 12:
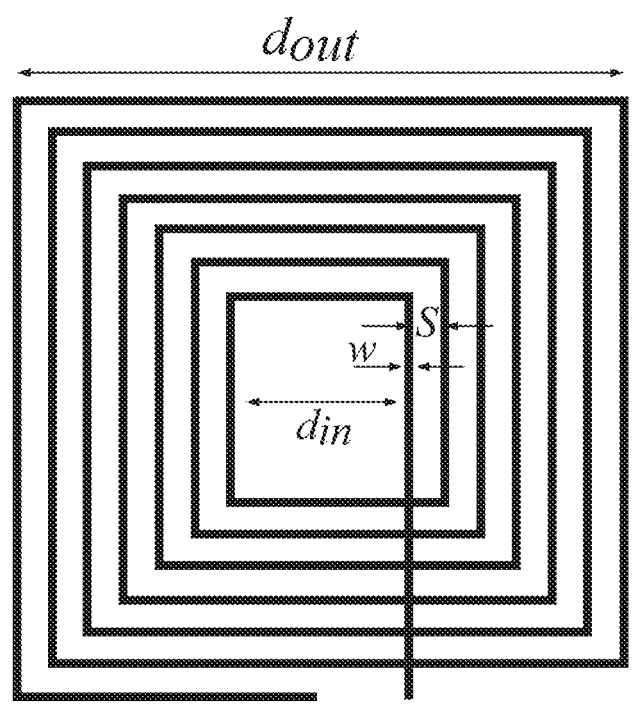
FIG. 12 (Prior Art) shows a schematic diagram to illustrate geometric parameters of a conventional planar square loop coil with conductive traces having uniform widths and spacings.

An example of a planar coil having a conventional topology, e.g. with rectangular or square turns, and uniform trace widths and uniform spacing between turns, is shown schematically in FIG. 12. A WPT system comprising a conventional square resonator coil of the configuration shown in FIG. 12, with uniform trace widths and spacings is described in an article by S-H Lee et al., (Energies 2019, 12, pp. 271). The Biot-Savart law may be used to calculate the magnetic field B(x, y, z) of an arbitrary coil comprising a wire filament by integration of the field over infinitesimal lengths dl, as illustrated schematically in FIG. 14. This type of simple coil topology, with numerous rectangular turns and uniform trace widths and uniform spacing between each turn, produces a highly non-uniform magnetic field distribution, because destructive and constructive fields generated by each turn will add up in a non-optimized form, resulting in high Q and large field variations.

Referring to the equivalent circuit shown in FIG. 3, the mutual inductance between the Tx and Rx resonator coils is related to the magnetic field by the following equations:

$$M = \left(\frac{\mu H_Z}{I_{Tx}}\right) \cdot (N_{Rx} A_{Rx}) \quad (1)$$

$$V_{Rx} = \omega M I_{Tx} = Z_{21} I_{Tx} \quad (2)$$

$$Z_{TxIn} = R_{Tx} + \frac{(\omega M)^2}{R_{Rx} + R_{load}} \quad (3)$$

where $H_Z$ is the magnetic field in the z direction generated by the current $I_{Tx}$ in the Tx coil, parameters $N_{Rx}$ and $A_{Rx}$ are the number of turns and area cross section, respectively, of the Rx coil. The relationship between the input current $I_{Tx}$ and the output voltage $V_{Rx}$ on the receiver coil is evident from equations (1) and (2). Large variations of the magnetic field will result in large variations of the voltage produced on the receiver side. This voltage variation can cause the operating temperature to exceed a range of safety in some areas. In a perfect series tuned resonant system, the load presented to the PA is related to the mutual inductance M by equation (3). Thus, large variations of mutual inductance result in corresponding variations in the load $R_{load}$ presented to the power amplifier (PA).

To mitigate the detrimental effects caused by large magnetic field variations, an optimized Tx resonator coil design methodology is now described. Firstly, the design methodology provides for optimization of the coil topology in which dimensions of each turn of the coil are configured to minimize, or at least reduce, magnetic field variations over the desired plane, e.g. an area charging plane at a specified distance from the plane of the Tx coil. This optimization of the coil topology to meet a target specification, e.g. for improved uniformity of the magnetic field enables the other sub-blocks of the WPT system to operate in a more robust manner. Secondly, a capacitor arrangement and values of tuning capacitors and network matching capacitors are selected for increased efficiency, as described in the previous section relating capacitor value synthesis for increased efficiency.

The basic principle of the proposed coil design methodology is to optimize the dimensions and distribution of each turn of the coil, to obtain an improved or optimized magnetic field uniformity, e.g. to meet a required target specification. The design methodology comprises a systematic coil synthesis procedure which provides a unique combination of dimensions of each turn to achieve an optimum field distribution based on a Figure of Merit (FOM), derived from the $H_z$ component of the magnetic field, to meet a required target specification for a wireless charging application. For example, the FOM may be based on a variance, such as standard deviation of $H_z$ (std$H_z$), over the charging plane. A target specification may include, e.g.: maximum dimensions of the Tx coil, transmit and receive power requirements, a gap distance $D_{gap}$ from the plane of the Tx coil to a charging plane, dimensions of the Rx coil or the required area of the charging plane, et al. For the resulting coil topology, the design methodology then comprises a capacitor value synthesis procedure to select values of tuning capacitors and network matching capacitors to maximize an efficiency, or at least provide a target efficiency, e.g. coil-to coil efficiency or other parameter, for the required Rx and Tx power and gap distance.

Coil Synthesis Examples

A FOM is defined, e.g. a target variance, e.g. a maximum variance, of the z direction magnetic field $H_z$ over a specified area of a charging plane at a distance $D_{gap}$ from the Tx coil surface. An arbitrary initial coil topology (which may be referred to as a reference coil topology) is defined, e.g. as shown schematically in FIG. 15A, and then an optimization process is performed to change parameters of the coil systematically to meet a target specification, e.g. the target variance or a minimum variance of the magnetic field Hz, over the specified area of the charging plane, to provide an optimized coil topology, e.g. as shown schematically in FIG. 15B. As shown schematically in FIG. 15B, the resulting coil topology may have a non-uniform distribution of turns, in which each turn has a unique configuration of trace width and spacings between traces for each turn.

Figure 13:
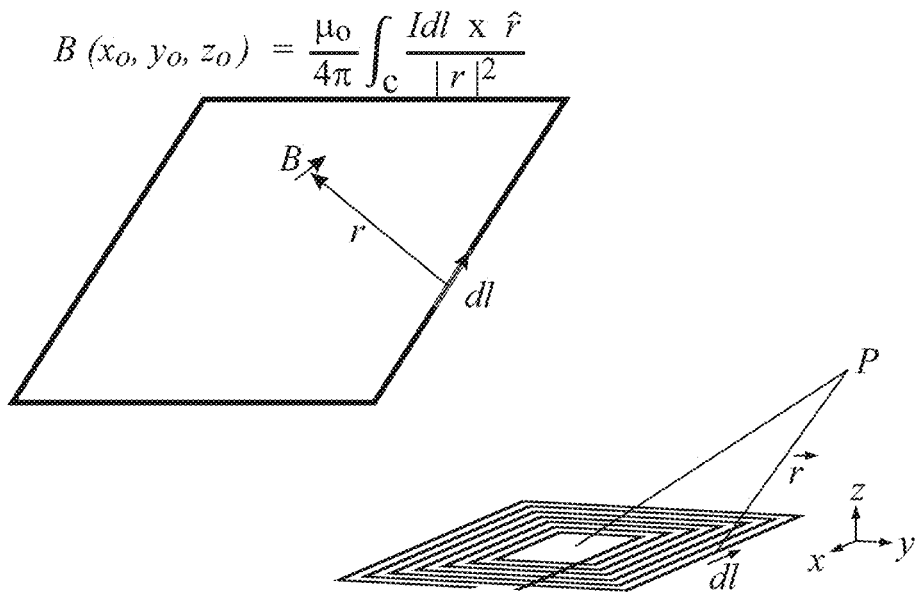
FIG. 13 (Prior Art) is a schematic diagram to illustrate calculation of a magnetic field B (x, y, z) by modelling of the planar coil of FIG. 12 as a wire filament and using the Biot-Savart law by integration over infinitesimal lengths dl.
Figure 14:
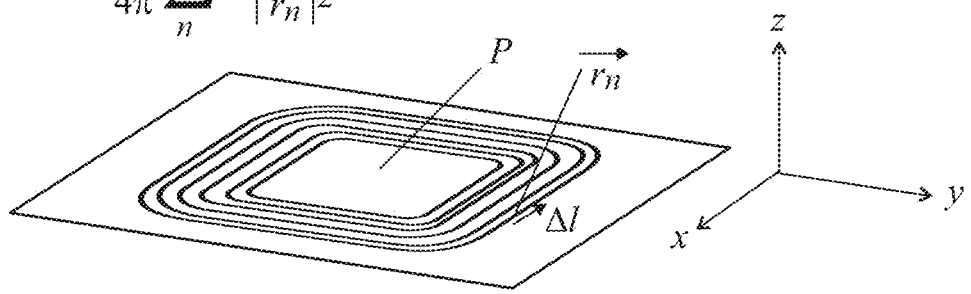
FIG. 14 (Prior Art) is a schematic diagram to illustrate a simplification of the Biot-Savart law for computation of a magnetic field B (x, y, z) for a planar coil modelled as a wire filament using the Biot-Savart law by summation over small lengths Δl.

The Biot-Savart law, as illustrated schematically in FIG. 13, can be used to find the magnetic field produced by an arbitrary current filament structure. The Biot-Savart law uses an integration formula to find the magnetic field at a certain observation point by summing the field caused by the infinitesimal parts constituting the whole structure, where I is the current through the infinitesimal length dl. $\hat{r}$ is the vector pointing from dl to the observation point ($x_0$, $y_0$, $z_0$). The current through all the spiral loops is assumed to be constant. In order to convert the integration formula to a more suitable form for computer calculation, the structure is divided in small elements or pieces of finite length $\Delta l$, instead of the infinitesimal pieces, so that the integration transforms into a summation as shown in FIG. 14, where $r_n$ is a vector that points from the center of the $\Delta l$ piece to the observation point P, as shown schematically in FIG. 14.

The coil topology synthesis procedure starts with selecting an arbitrary initial coil topology, for example, a planar spiral coil having n turns of a rectangular or square form with rounded corners, as illustrated schematically in FIG. 13A, and obtaining an initial set, or population, of parameters defining the initial coil topology, i.e. a set of geometric parameters defining the dimensions of each element $\Delta l$ of the coil to enable the magnetic field to be calculated based on the Biot Savart summation. For example, as shown schematically in FIG. 14 for a coil with n concentric generally rectangular turns, with rounded corners, where lengths of the nth turn are an and bn, and initial values are selected to begin an optimization as follows:

$a_1$ and $b_1$ are the lengths of the largest (outer) turn;
$a_1$ and $b_1$ are selected to provide a coil of the required outer dimensions, e.g. <275 mm square;
$a_n < a_{n-1} \ldots < a_1$ and $b_n < b_{n-1} \ldots < b_1$;

For example, for resonator coil with four turns n=4, as shown in FIG. 15A, the smallest (inner) turn has lengths $a_4$ and $b_4$.

A minimum distance is set between turns, $d_{space}$=trace width+trace spacing. For example, a $d_{space} \geq 10$ mm provides for a minimum of e.g. 5 mm trace width and 5 mm spacing between traces, so initially $a_n < a_{n-1}+11$ mm and $b_n < b_{n-1}+11$ mm.

Using this initial arbitrary coil topology, an initial population of parameters comprising $(a_1, b_1 \ldots a_n, b_n)_{initial}$ defining the coil topology is obtained. In this simple example, the initial parameters are the set of values $(a_n, b_n)_{initial}$ for each of the n turns. Of course, for a more complex coil topology, in addition to defining $(a_n, b_n)$ for each turn, a larger number of parameters (e.g. $(a_1, b_1 \ldots x_1, \ldots a_n, b_n \ldots x_n)$ may be needed to define each turn, e.g. to account for optimizing the dimensions of rounded corners of each turn relative to the straight portions ($a_n$, $b_n$) for each turn. The initial set of parameters defining the coil topology is used as a starting point for optimization of the coil topology to meet a target specification. The target specification, including a FOM, is selected. For example, the FOM is defined as a minimum variance of the z-direction magnetic field $H_z$ over an area of a charging plane a specified distance $D_{gap}$, e.g. 200 mm, from the Tx coil surface. For example, the area of the charging plane may be defined as an area encompassed by a specific percentage, e.g. 30%, of the coil outer dimension.

The z-component of the magnetic field over the area of the charging plane is computed using the Biot-Savart summation for the initial population of parameters ($a_1$, $b_1$ ... $a_n$, $b_n$)$_{initial}$ defining the initial coil topology, and the uniformity of the z-component of the magnetic field over the area of the charging plane, or other selected plane is evaluated. For example, the uniformity over the area of the plane is evaluated based on a relative standard deviation to provide a value of a cost or fitness function c. The initial population of parameters ($a_1$, $b_1$, ... $a_n$, $b_n$)$_{initial}$ or ($a_1$, $b_1$, ... $a_n$, $b_n$)$_{m=1}$ is then changed systematically to a second population ($a_1$, $b_1$, ... $a_n$, $b_n$)$_{m=2}$. $H_z$ is calculated for a plurality of points P over the area of the plane, and the uniformity of $H_z$ over the area of the plane is evaluated. The process is repeated for each subsequent population m of parameters ($a_1$, $b_1$, ... $a_n$, $b_n$)$_m$ for m=3 to M, to find a population of parameters which provides the best $H_z$ field uniformity. The uniformity of the $H_z$ field may be, for example, an optimized or minimum value of the relative standard deviation of $H_z$ over the area of the charging plane, that meets the target specification. The target or optimized population of parameters ($a_1$, $b_1$, ... $a_n$, $b_n$)$_{target}$ defines a coil topology e.g. comprising n turns with non-uniform trace widths and spacings as illustrated schematically in FIG. 15B, that meets the target specification. The population of parameters is then output, e.g. as a set of parameters for a CAD design tool which specifies the optimized coil topology. The target or optimized population of parameters ($a_1$, $b_1$, ... $a_n$, $b_n$)$_{target}$ define device dimensions, e.g. for fabrication of the coil using PCB technology, i.e. in which the coil turns are patterned or printed as one or more layers of conductive copper traces on/in a single or multilayer dielectric substrate.

In a Tx resonator design of one example embodiment, the structure comprises a spiral coil with square turns and round corners, to form a spiral of 27 cm width and 27 cm length with n=4 turns. The initial topology is a spiral based on 4 concentric squares of an and $b_n$ widths and lengths respectively as illustrated in FIG. 13A, $a_n$ and $b_n$ are the optimization variables and for four turns there will be 6 variables since $a_1$ and $b_1$ are constants both equal to 27 cm, i.e. the length and width of the spiral perimeter. The minimum distance between turns is e.g. 10 mm, to assure enough space for a minimum 5 mm trace and 5 mm space. Also, the width and length for a turn should be greater than the next smaller turn i.e. $a_n > a_{n-1}$ and $b_n > b_{n-1}$.

In the case of large field variations, i.e., large $Z_{21}$ variations, a very limited range of $I_{Tx}$ provided by the PA will satisfy the voltage range permitted by the voltage regulator. This will result in a non-stable system that cannot be optimized by the feedback loop of the system.

The optimization problem, where $\hat{z}$ is the unit vector in z direction, is $$\arg_{a_n, b_n} \min(\text{std}(B(a_n, b_n))), \text{subject to}: 0 < a_n < 27 \text{ cm}, 0 < b_n < 27 \text{ cm}$$

$z_o = 100$ mm, $0 < x_o < 15$ cm, $0 < y_o < 15$ cm

Linear constraints: $a_n > a_{n-1} + 11$ mm, $b_n > b_{n-1} + 11$ mm

Figure 17:
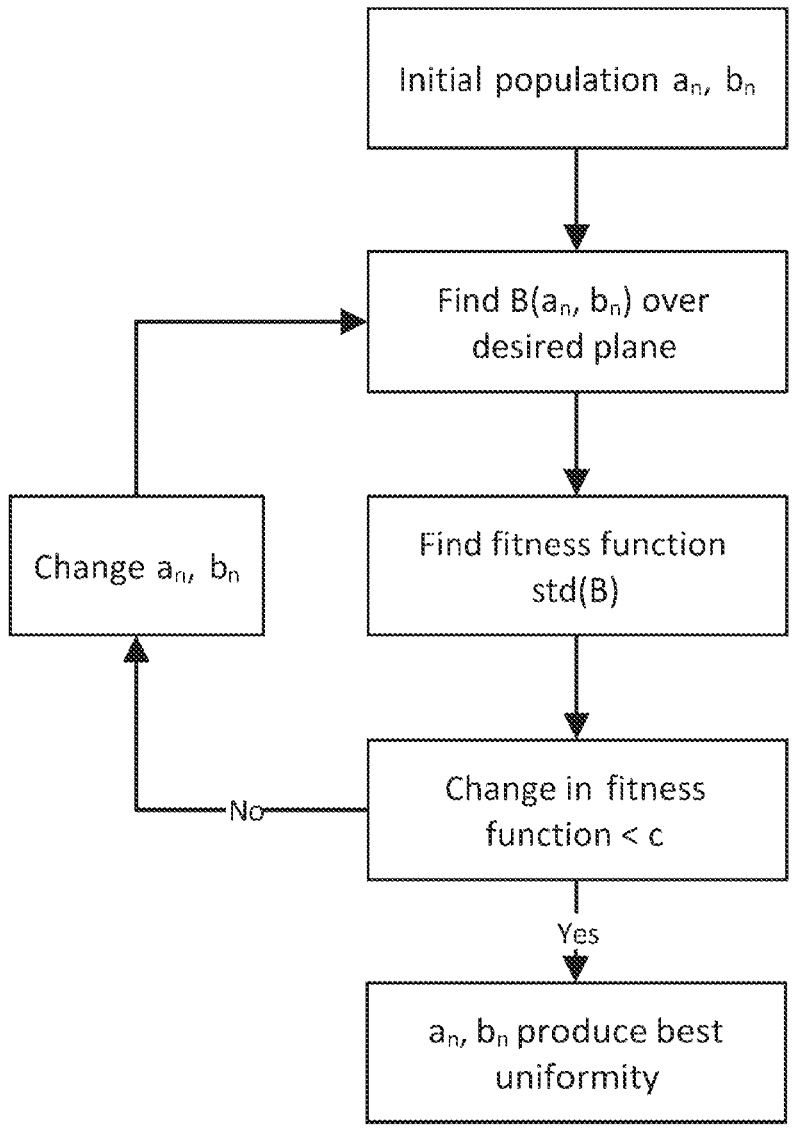
FIG. 17 is a simplified a flow chart to illustrate a method of resonator coil synthesis according to an embodiment based on optimization of a Figure of Merit (FOM), in this example, the FOM comprises a standard deviation of the magnetic field $B_z$ over an area of a charging plane at a distance $D_{gap}$ from the plane of the Tx resonator coil.

In the resonator coil of this embodiment, a genetic algorithm is employed to solve the optimization problem, as illustrated schematically in the simplified flow chart of FIG. 17. The optimization process starts with an arbitrary set of $a_n$ and $b_n$, e.g. ($a_n$, $b_n$)$_{initial}$ for each of the n turns (15-1) and continues for each of a plurality of m populations of ($a_n$, $b_n$)$_m$. The criteria for stopping the optimization is the amount of change of the cost function. If the change of the cost function is <c, i.e. less than a target value (15-4) At that point, the set values of $a_n$ and $b_n$ are the best found to realize uniformity (15-5), otherwise the values of an and $b_n$ are changed (15-6) and the process is repeated again.

Figure 18:
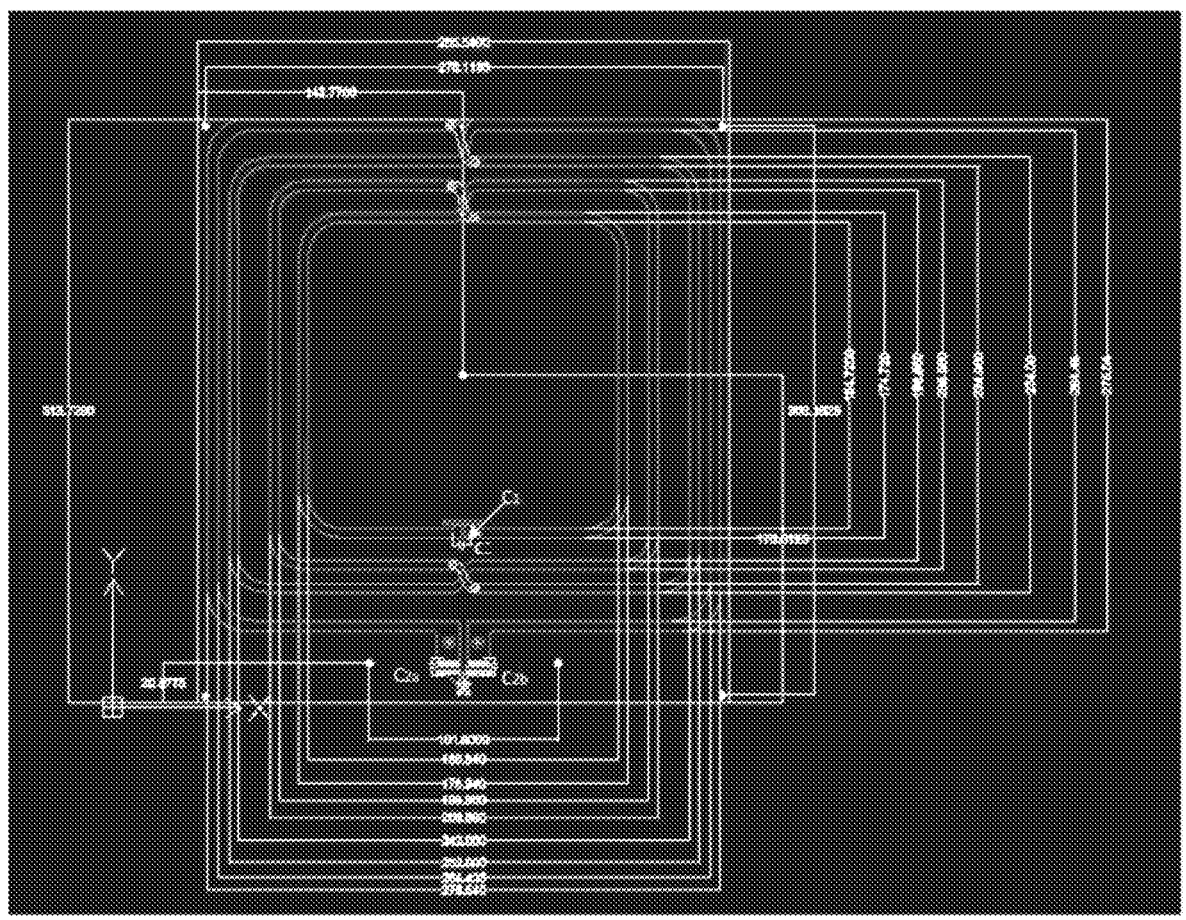
FIG. 18 is a CAD drawing showing dimensions of a resonator coil of a first example embodiment, designed to optimize a variance of the $H_z$ magnetic field over an area of a desired charging plane, to meet a target specification, and showing the positions and values of tuning capacitors C2a and C2b and network matching capacitor C1.

Using the algorithm represented by the simplified flow chart of FIG. 17, the coil topology of an example embodiment, comprising dimensions as shown in the CAD drawing of FIG. 18 was obtained, comprising 4 turns, each turn having specific different (i.e. non-uniform) turn dimensions and turn spacings. FIG. 18 also shows positions and values of the tuning capacitors C2a and C2b (each 360 pF) and matching capacitor C1 (180 pF).

A coil topology of another example embodiment is shown in FIG. 18A. The simulated $H_z$ field for this coil topology is shown in FIG. 18B. In this example, the FOM, as defined by a percentage standard deviation of the z-component of the field is 15% over 50% of the coil area at an observation plane of 100 mm height.

Figure 19A:
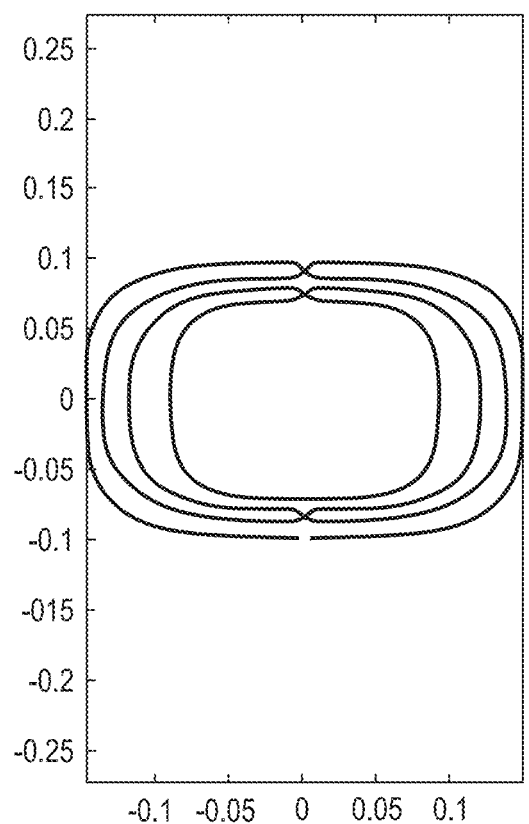
FIG. 19A shows a schematic diagram of a resonator coil topology of a second example embodiment.
Figure 19B:
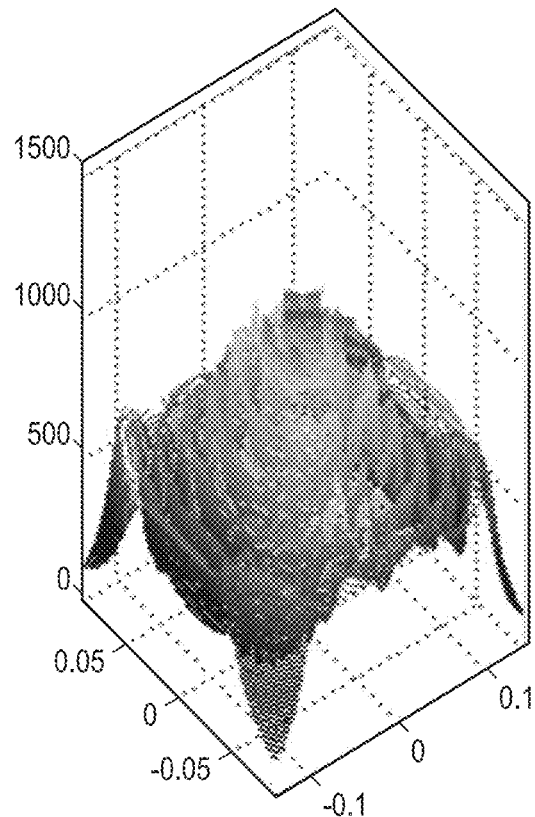
FIG. 19B shows a three-dimensional plot of a simulated H field used to calculate the FOM for the coil of FIG. 19A.
Figure 20A:
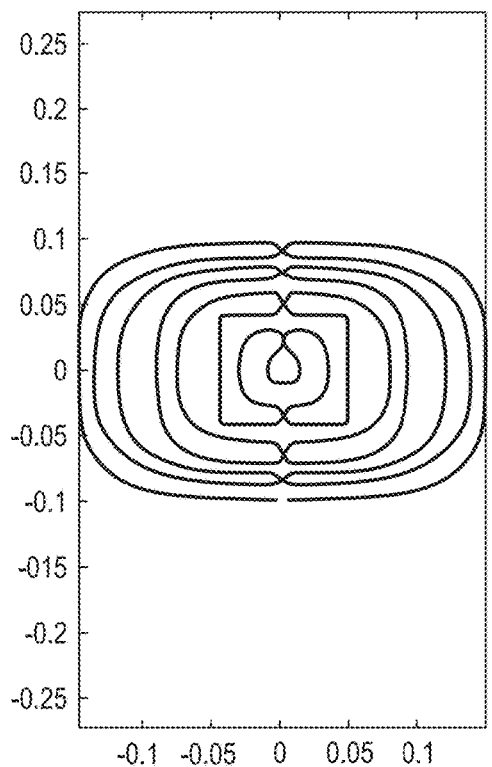
FIG. 20A shows a schematic diagram of a resonator coil topology of a second example embodiment.
Figure 20B:
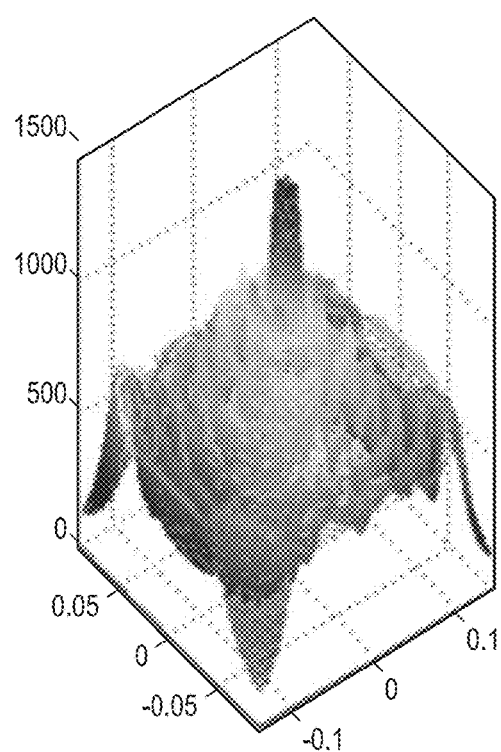
FIG. 20B shows a three-dimensional plot of a simulated H field used to calculate the FOM for the coil of FIG. 20A.
Figure 20C:
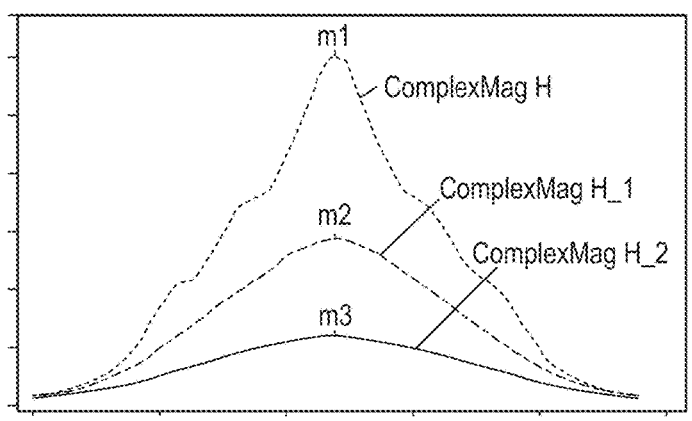
FIG. 20C shows a two dimensional plot of the magnetic field distribution simulation in a target area for gap distances $D_{gap}$ of 50 mm, 100 mm and 150 mm for the coil of FIG. 20A.
Figure 20D:
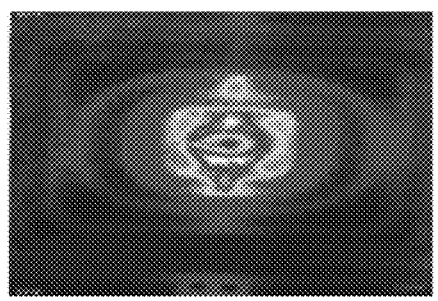
FIG. 20D shows a thermal map of the coil of FIG. 20A during operation.

A coil design of yet another example embodiment is shown in FIG. 19A. The calculated $H_z$ field is shown in FIG. 19B. FIG. 19C shows a two dimensional plot of the magnetic field distribution for planes a height of 50 mm, 100 mm and 150 mm above the plane of the coil. FIG. 19D shows a thermal simulation of the coil in operation.

Figure 16:
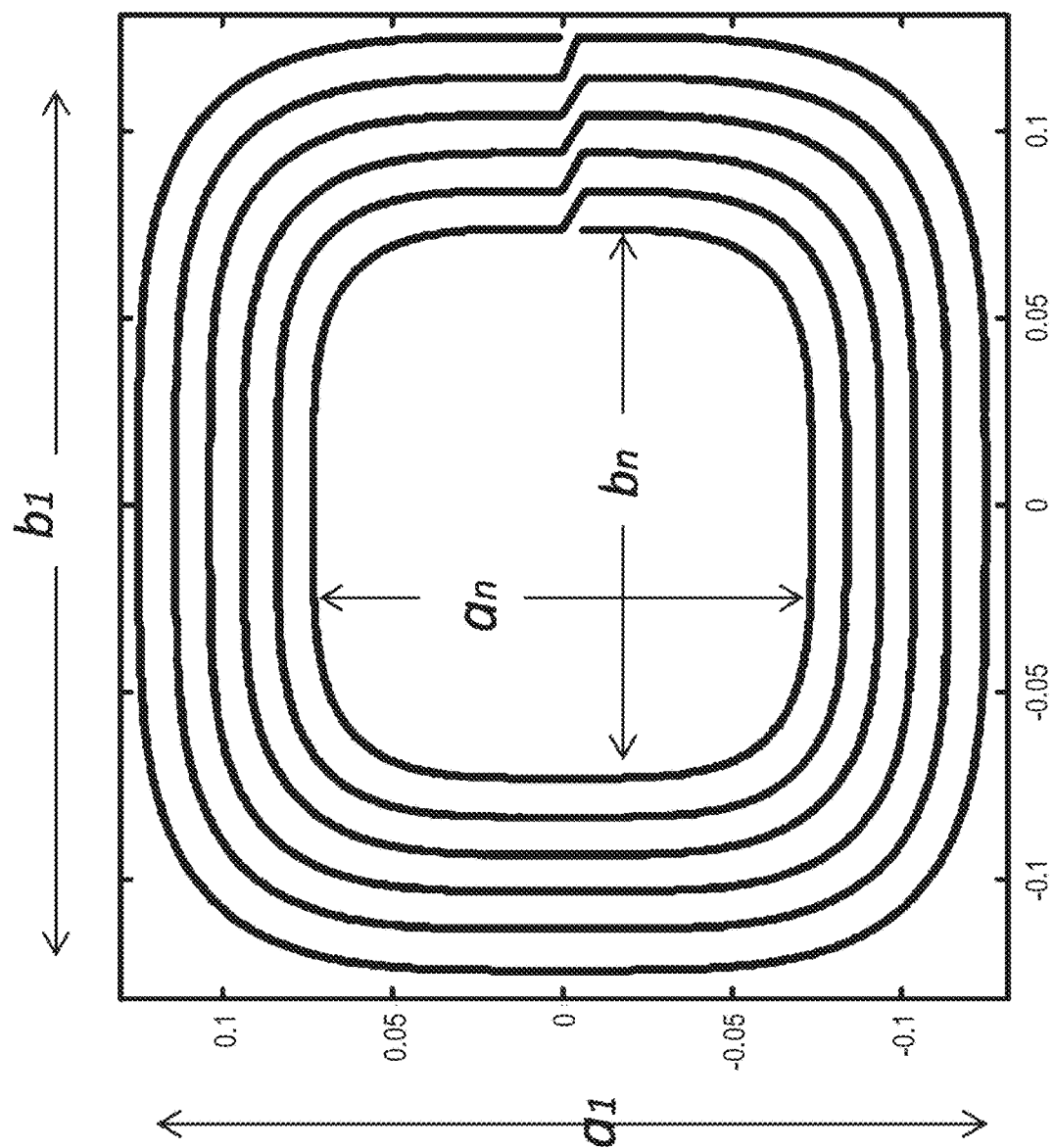
FIG. 16 shows a schematic diagram of an example of an initial coil topology for configuring a planar resonator coil of an example embodiment.
Figure 21:
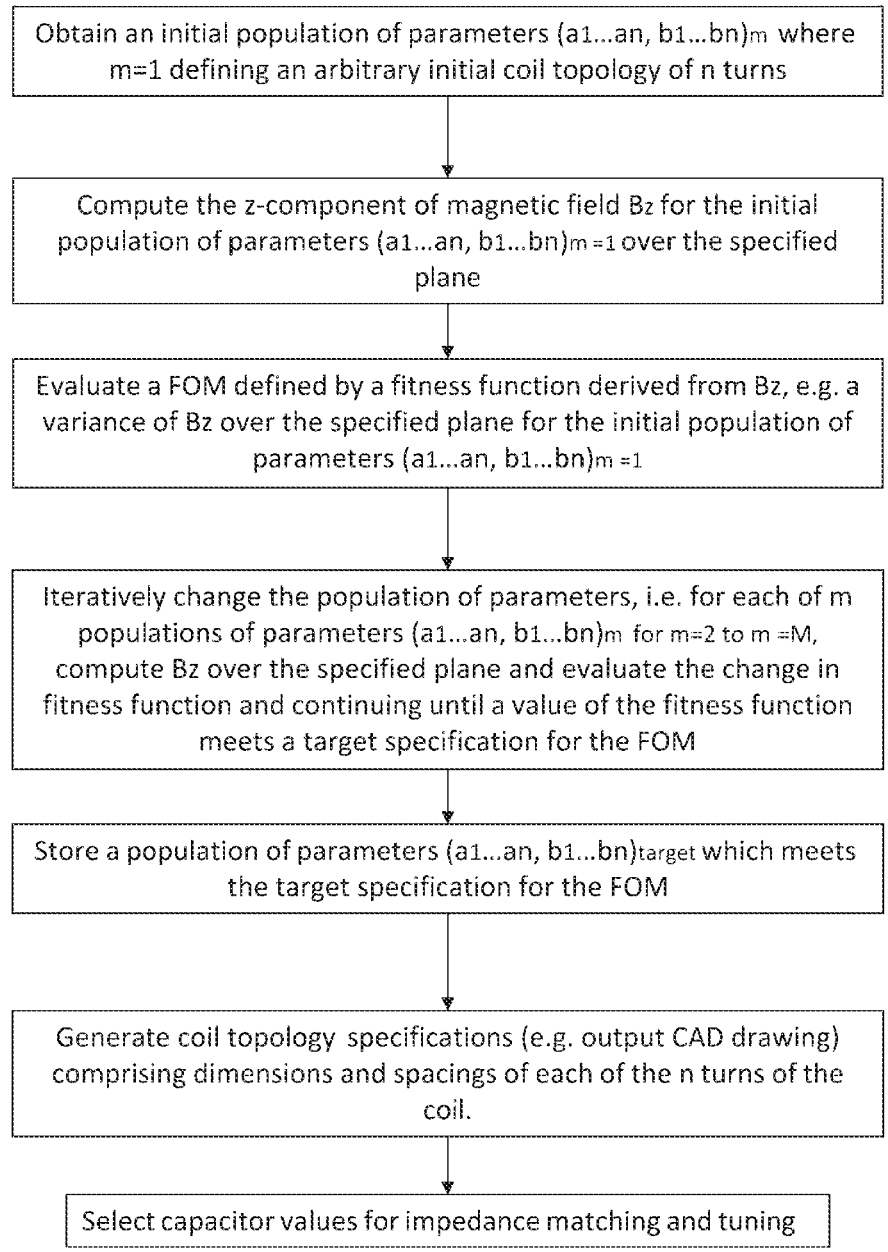
FIG. 21 is a flow chart to illustrate a method of resonator coil synthesis of an embodiment, based on optimization of a Figure of Merit (FOM)
Figure 22:
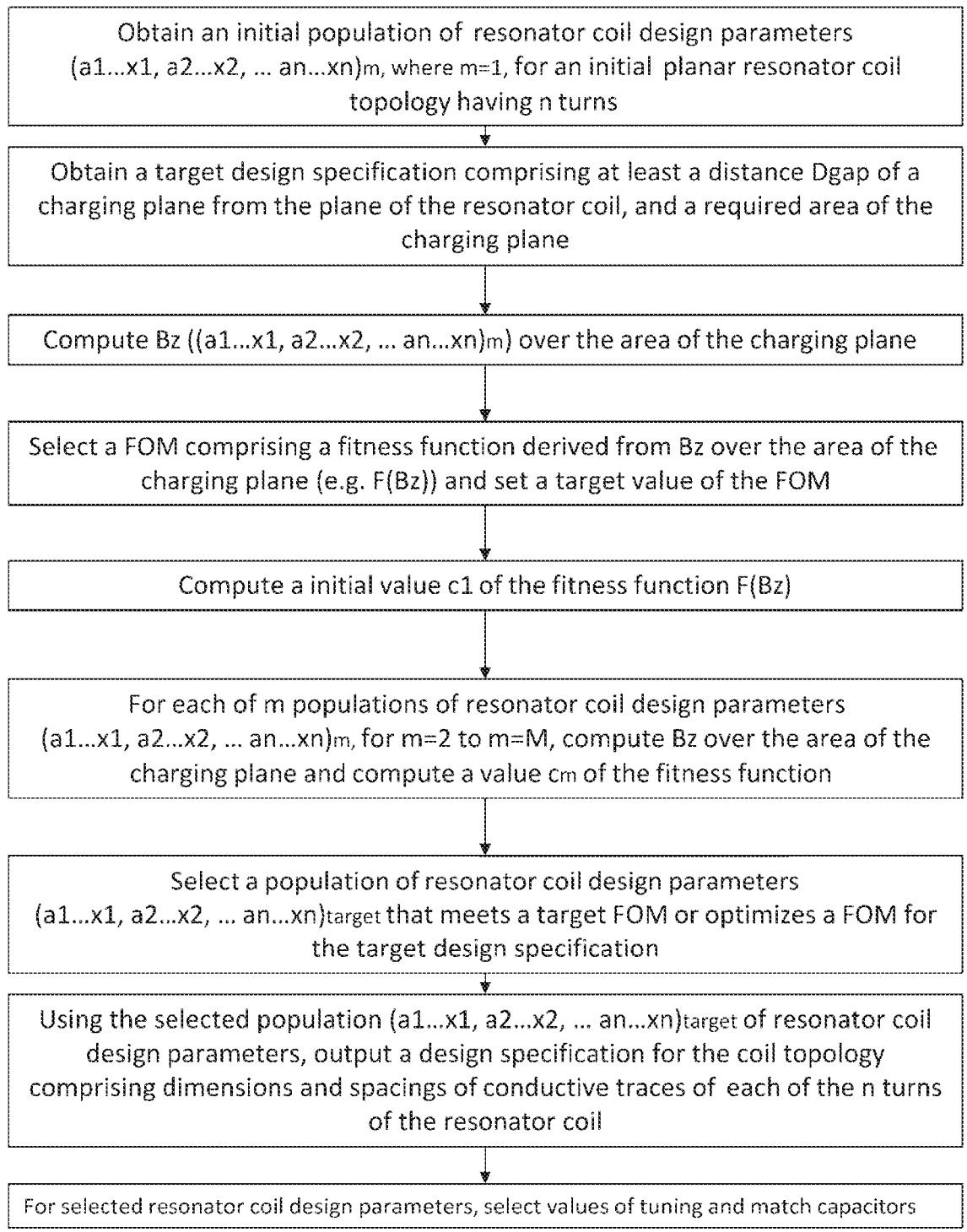
FIG. 22 is a flow chart to illustrate a method of resonator coil synthesis of another embodiment, based on optimization of a Figure of Merit (FOM)

Flowcharts comprising method steps for coil synthesis of other example embodiments are shown in FIGS. 21 and 22. The method shown in the simplified flowchart of FIG. 17 is applicable to a coil topology such as shown in FIG. 16, in which each turn is generally rectangular, with rounded corners, and each turn n can be defined simply by dimensions an and $b_n$, and the FOM is defined as a standard deviation of $B_z$ or $H_z$ over an area of a plane a distance $D_{gap}$ from the plane of the Tx coil. The method represented by the flowchart of FIG. 21 is applicable to a coil topology, in which each turn n is defined by a set of parameters $a_n$, $b_n$, and a FOM is defined by a fitness function derived from $B_z$, which may, e.g. be a variance of $B_z$, or other function, to evaluate whether a target specification is met. The method represented by the flowchart of FIG. 22 is more generally applicable to an arbitrary coil topology, in which each turn n is defined by an expanded or set of parameters (e.g. $a_n$, $b_n$, ... $x_n$, for each turn n), e.g. for coils of more complex geometries where are larger number of parameters is needed to define the geometry of each turn. In the methods shown schematically in the flowcharts of FIGS. 21 and 22, after optimization of the coil topology, i.e. defining coil dimensions that meet a required target specification, then capacitor values are selected for tuning and impedance matching. Capacitor value synthesis is described in detail above.

The output of the coil topology synthesis may be a set of parameters ($a_1$, $b_1$, ... $a_n$, $b_n$)$_{target}$ which define dimensions of each of the n turns, e.g. coil topology specification for output to a CAD system. For example, FIG. 18 is a CAD drawing showing dimensions and spacing of the conductive traces defining each turn of a coil of a prototype embodiment, configured for fabrication using standard PCB technology, as illustrated in the photograph of the prototype shown in FIG. 9(C). Each turn has unique dimensions and spacings configured to optimize the variance of the magnetic field over a required area of the charging plane. Thus unlike conventional coil topologies having turns with uniform trace widths and spacings, coil topologies are defined by coil parameters in which dimensions, such as trace widths and spacings of each individual turn, are configured to optimize a Figure of Merit (FOM), e.g. a standard deviation of the z component of magnetic field $H_z$, over an area of a charging plane at a specified distance, or distance range, $D_{gap}$ from the coil. The arrangement of capacitors is configured for impedance and network matching for improved efficiency.

After the coil topology synthesis procedure, and capacitor synthesis procedure, the proposed coil designs were analyzed using a three dimensional electromagnetic field simulation tool e.g. ANSYS HFSS (High Frequency Structure Simulator) to validate the design.

Addition of a network matching series capacitor C1, at the center (mid-point) of the coil, and if required, a network matching shunt capacitor C3, of appropriate values has been demonstrated to increase efficiency of coil-to-coil energy transfer and increase system end-to-end efficiency.

An important characteristic exhibited by this form of coil design is high efficiency at low mutual coupling with a large gap between the Tx and Rx coils. This characteristic allows for efficient resonant WPT over larger gaps, e.g. 100 mm to 300 mm or more, and for a higher range of power transfer, e.g. hundreds of watts to a kilowatt. For example, these ranges far exceed the current AirFuel specifications, e.g. for 6.78 MHz with a maximum gap of 50 mm, and more limited power transfer of 70 W.

FIGS. 23A, 23B, 23C and 23D show some sample data for a coil topology of an example prototype embodiment, with tuning and network matching capacitors comprising capacitor values C1, C2a. C2b, and C3 as shown in FIG. 6, and corresponding data for the same coil topology with a conventional capacitor arrangement comprising only tuning capacitors C2a and C2b, as shown in FIG. 7.

Figure 23A:
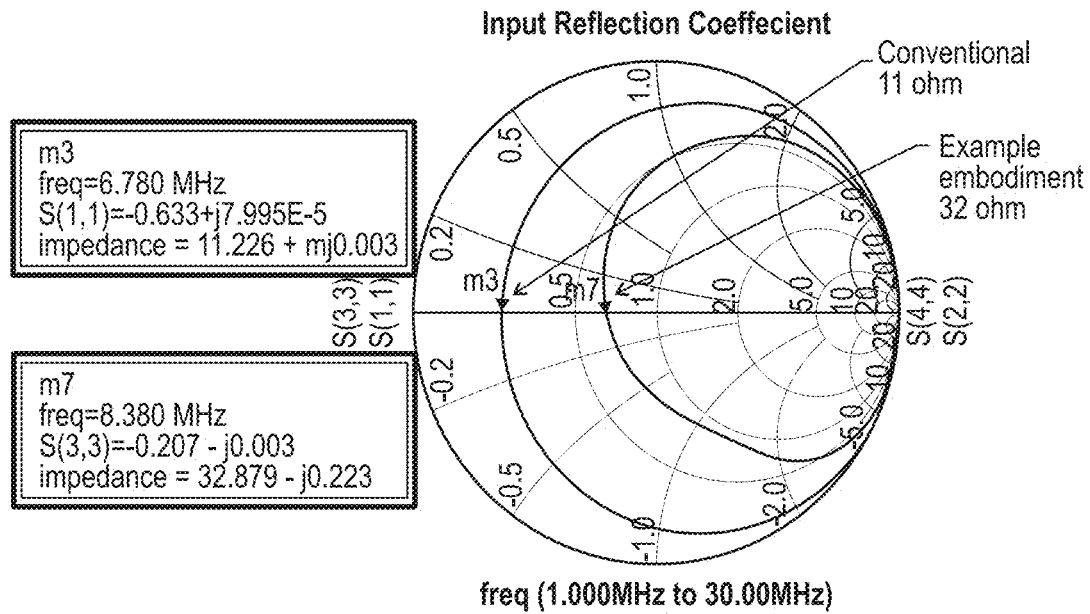
FIG. 23A shows simulation results for the Tx impedance (Input Reflection Coefficient) of a) a resonator coil of an example embodiment comprising an arrangement of tuning and matching capacitors C1, C2a, C2b and C3 and b) a resonator coil comprising a conventional arrangement of tuning capacitors C2a and C2b.
Figure 23B:
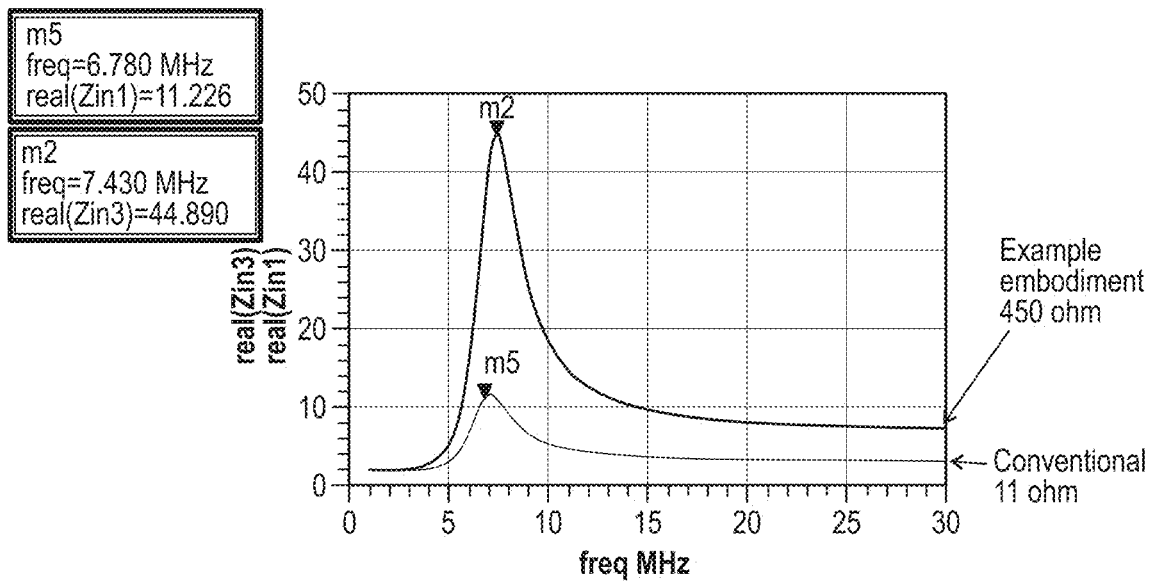
FIG. 23B shows simulation results for the peak Tx impedance of a) the resonator coil of the example embodiment comprising the arrangement of tuning and matching capacitors C1. C2a, C2b and C3 and b) the resonator coil comprising a conventional arrangement of tuning capacitors C2a and C2b.
Figure 23C:
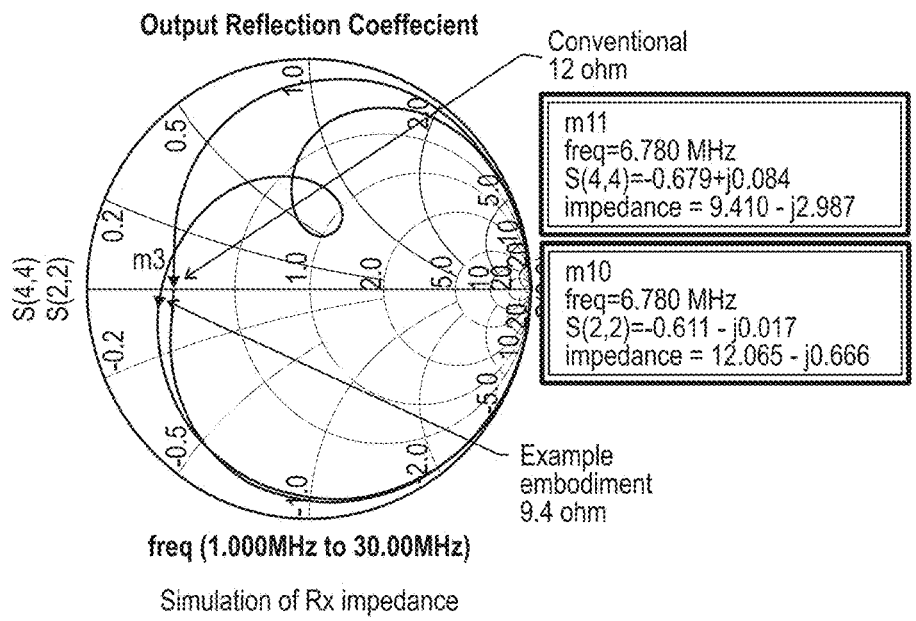
FIG. 23C shows simulation results for the Rx impedance (Output Reflection Coefficient) of a) the resonator coil of the example embodiment comprising the arrangement of tuning and matching capacitors C1, C2a, C2b and C3 and b) the resonator coil comprising a conventional arrangement of tuning capacitors C2a and C2b.
Figure 23D:
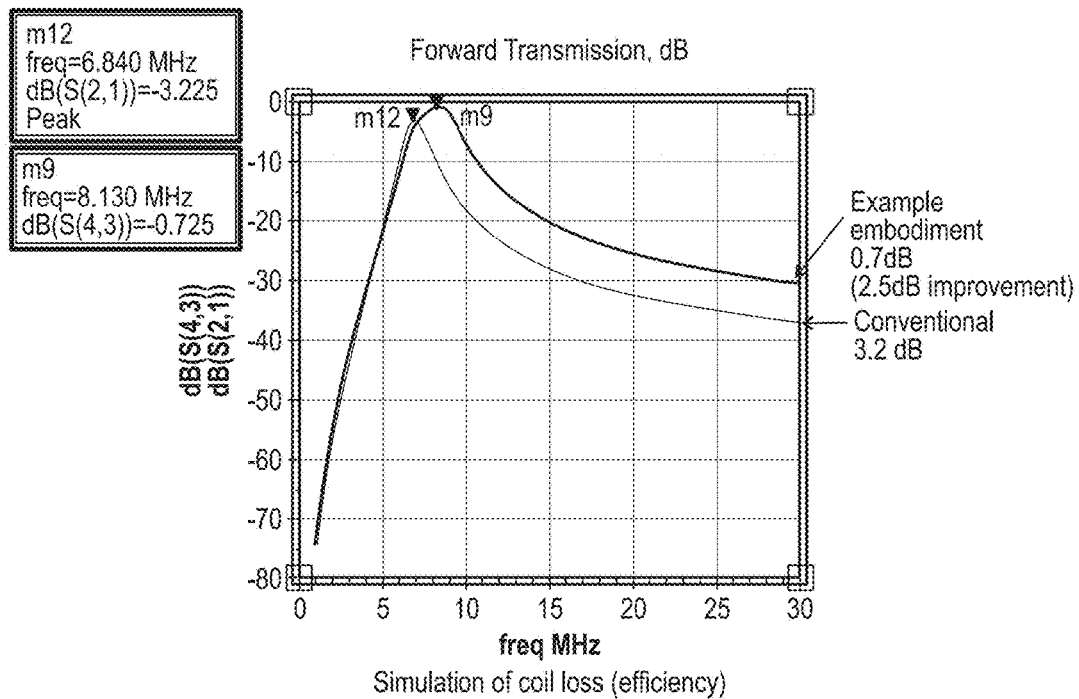
FIG. 23D shows simulation results for the coil loss (efficiency) of the resonator coil of a) the example embodiment comprising an arrangement of tuning and matching capacitors C1, C2a, C2b and C3 and b) the resonator coil comprising a conventional arrangement of tuning capacitors C2a and C2b; and FIG. 24A

FIG. 23A shows the simulated Tx impedance at the resonating frequency point; FIG. 23B shows simulated peak Tx impedance; FIG. 23C shows the simulated Rx impedance at the resonating frequency point; and FIG. 23D shows simulated loss (efficiency). As illustrated by these sample data, the Tx impedance is increased from 11 ohm for the conventional tuning capacitor arrangement to 32 ohm for the example embodiment including network matching capacitors C1 (series) and C3 (shunt) (FIG. 23A). The peak Tx impedance is increased from 11 ohm for the conventional arrangement to 45 ohm for the example embodiment (FIG. 23B). The Rx impedance is decreased from 12 ohm for the conventional arrangement to 9.4 ohm for the example embodiment (FIG. 23C). Thus, with increased Tx impedance and reduced Rx impedance, loss is reduced from 3.2 dB for the conventional arrangement to 0.7 dB for the example embodiment, which is a 2.5 dB improvement. That is, the coil-to-coil efficiency at the resonant frequency is significantly improved by adding network matching capacitors C1 (series capacitor at center of the coil) and C3 (input (Tx) shunt capacitor), to increase the Tx impedance, and provide a significantly higher peak Tx impedance at the resonant frequency, which reduces S11 (input reflection coefficient or input return loss) at the resonant frequency.

The optimized coil topologies of the example embodiments can be fabricated using conventional PCB technology, e.g. copper metal traces on a dielectric substrate. The use of PCB technology to implement the coil topology is advantageous because it permits a very tight control on process variations, and the parameters of each turn of the coil can be optimized. Additionally, since PCB technology is a very mature technology it is suitable for high volume manufacturability as well as case of integration with other components. Another advantage is the low z height possible to achieve with this technology. In the example prototype designs, the total thickness of the PCB coil board is e.g. 0.8 mm, as compared to conventional Airfuel wire coil, which has a thickness of 4.2 mm.

Figure 24A:
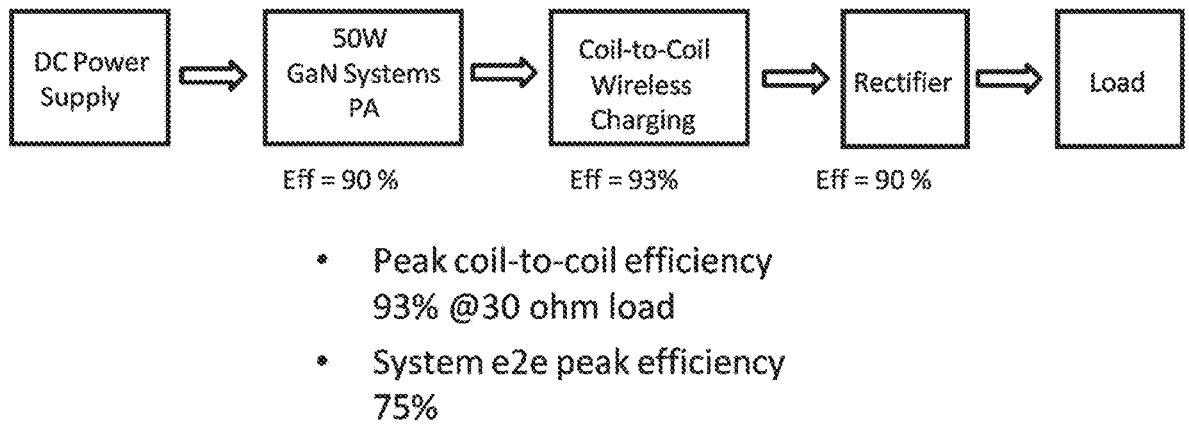
FIG. 24B shows sample data for a measured coil-to-coil efficiency and end-to-end system efficiency for an example of a large gap WPT transfer system at 50 W output power.
Figure 24B:
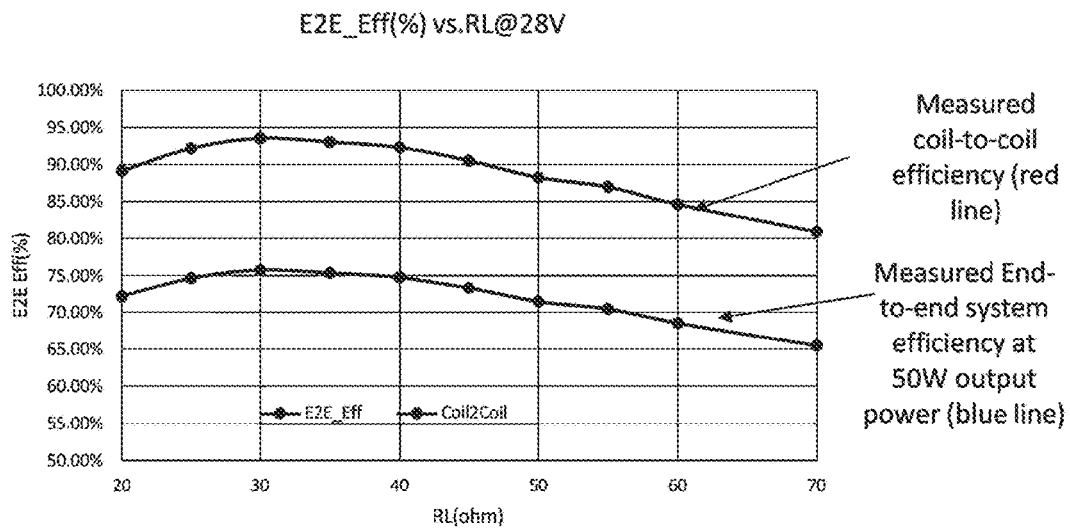

FIGS. 24A and 24B provide some measured data for one example of a WPT system comprising a 50 W PA (GaN Systems Inc. technology), a Tx coil and an Rx coil (identical coils configured as shown in the photograph in FIG. 9(C), which are designed for improved uniformity of the magnetic field Hz over the area of the charging plane, with a 30 ohm output load impedance, output power of 50 W, for a gap of 200 mm. The measured peak coil-to-coil efficiency was 93% and a system end-to-end (E2E) efficiency of 75%.

Usually, PCB coils exhibit high resistance due to dielectric losses and small trace thicknesses. To combat this, the prototype coil was constructed by connecting three identical PCB metal layers connected in parallel using vias. The coil comprises a small number of turns, so that the coil length is shorter than conventional coil designs. Using this PCB fabrication technique permits the design of a lower loss coil. The low resistance of the Tx coil also contributes to improved efficiency.

Some example coil topologies of specific embodiments have been described by way of example only. It will be apparent that the specific design parameters for a Tx or Rx coil will be dependent on a target specification for a specific customer and application, and the FOM selected for optimization. Where the FOM is a variance of the magnetic field over a specified area of a charging plane at a distance $D_{gap}$ from the plane of the Tx coil, it may be desired to optimize the FOM by finding coil parameters that minimize this chosen variance, e.g. a relative standard deviation of Bz of the magnetic field over the charging plane. In other instances, it may be sufficient to end the optimization process when the variance meets a target specification. Example embodiments are presented that enable more efficient WPT for gaps in the range of ~200 mm, for example for through-wall WPT. The design methodology may also be used to optimize the $H_z$ field of coil designs which are configured for charging over wider gap range, e.g. 200 mm±20 mm, i.e. to provide improved efficiency and reduced losses as the Rx coil is moved away from the main charging plane.

The FOM is selected to optimize efficiency over a large gap, i.e. meet a target specification, and preferably maximize the efficiency, e.g. for reduced losses, improved thermal performance, et al. For example, during prototyping, for a 200 mm gap, it has been demonstrated >90% coil-to-coil efficiency is can be achieved, and for a 300 mm gap close to 90% efficiency may be achievable. Proper selection of capacitors for impedance matching and tuning also contributes to increased system efficiency, e.g. by matching the input impedance to allow the power amplifier to operate in a range of maximum efficiency. The design methodology is applicable, e.g. to coil sizes (i.e. maximum outer dimensions) and gap distances Dgap ranges in the range of ~100 mm to ~500 mm, e.g. for power in the range of 10s of watts to 100s of watts, e.g. a range of 40 W to >500 W or more, e.g. 1 kW. Beneficially, a genetic algorithm may be used for the FOM optimization process. Other types of optimization algorithms may be applicable.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method of configuring a resonator coil, comprising:
obtaining a population of parameters $(a_1, b_1, \ldots a_n, b_n)_{initial}$ defining an initial (reference) coil topology to be optimized, the population of parameters $(a_1, b_1, \ldots a_{n\ n}, b_n)_{initial}$ defining comprising: a maximum coil dimension, a number of turns, a minimum spacing between turns, a minimum trace with, et al. for each turn;
obtaining a target specification, comprising:
  selecting a gap distance $D_{gap}$ from the coil to a charging surface;
  selecting a charging area $Area_{charging}$ of the charging surface relative to an area of the coil $Area_{coil}$;
  selecting a Figure of Merit (FOM) which is derived from a vertical magnetic field distribution $H_z$ over the charging area $Area_{charging}$ of the charging surface at gap distance $D_{gap}$ from the coil;
a) for the initial population of parameters $(a_1, b_1 \ldots a_n, b_n)$, computing the vertical magnetic field distribution $H_z$ over the charging plane;
b) computing the FOM based on a fitness function $F(H_z)$ over said area of the charging plane;
c) systematically changing the population of parameters, and for each of a plurality of m populations of parameters $(a_1, b_1 \ldots a_n, b_n)_m$ where m=2 to m=M, computing $H_z$ over the charging plane and computing the fitness function $F(H_z)_m$ over the charging plane;
d) when the value of the fitness function $F(H_z)$ for an mth population of parameters $(a_1, b_1 \ldots a_n, b_n)_m$ meets a target specification, storing the mth population of parameters $(a_1, b_1\ a_n, b_n)_m$ as a target population of parameters; and
e) outputting the set of parameters $(a_1, b_1 \ldots a_n, b_n)_m$ corresponding to the target value of the fitness function $F(H_z)$, to define a coil topology meeting the target specification having a coil distribution comprising said dimensions, trace widths and spacings of each of the n turns.

2. The method of claim 1 wherein the FOM is a variance of the vertical magnetic field distribution $H_z$ over a target area of a charging plane spaced a distance $D_{gap}$ from the plane of the plan of the coil.

3. The method of claim 2 wherein the target specification comprises minimum value of said variance.

* * * * *